United States Patent
Ichimoto et al.

[11] Patent Number: 5,826,559
[45] Date of Patent: Oct. 27, 1998

[54] LEAN-BURN INTERNAL COMBUSTION ENGINE

[75] Inventors: Kazuhiro Ichimoto, Nagoya; Katsuhiko Miyamoto, Funai-gun; Shogo Omori, Okazaki; Hitoshi Kamura, Kyoto; Atsuyoshi Kojima, Toyota, all of Japan

[73] Assignee: Mitsubishi Jidosha Kogyo Kabushiki Kaisha, Tokyo, Japan

[21] Appl. No.: 883,373

[22] Filed: Jun. 26, 1997

[30] Foreign Application Priority Data

Jun. 28, 1996 [JP] Japan .................................. 8-169614
Apr. 30, 1997 [JP] Japan .................................. 9-112823

[51] Int. Cl.$^6$ .................................................. F02B 17/00
[52] U.S. Cl. ............................................................ 123/295
[58] Field of Search .................................. 123/295, 294, 123/431, 434, 672, 682, 683, 684, 687, 678

[56] References Cited

U.S. PATENT DOCUMENTS

| | | | |
|---|---|---|---|
| 5,031,594 | 7/1991 | Morikawa | 123/295 |
| 5,078,107 | 1/1992 | Morikawa | 123/295 |
| 5,170,760 | 12/1992 | Yamada et al. | 123/295 |
| 5,333,583 | 8/1994 | Matsura | 123/295 |

FOREIGN PATENT DOCUMENTS

| | | | |
|---|---|---|---|
| 5823244(A) | 2/1983 | Japan | 123/295 |
| 6117280(A) | 4/1994 | Japan | 123/295 |
| 07247866(A) | 9/1995 | Japan | 123/295 |

Primary Examiner—Raymond A. Nelli

[57] ABSTRACT

A lean-burn internal combustion engine capable of stably securing a satisfactory vacuum for a vacuum actuator which uses a vacuum in an intake manifold disposed on the side downstream of an intake air amount control mechanism, while preventing a deterioration of a specific fuel consumption and a drivability of the engine. A filling state of gases in the intake manifold is controlled based on pieces of information in respect of an engine operating state and a reduction in vacuum, whereby a vacuum such as to ensure the operation of the vacuum actuator is secured. A control for inhibiting a lean-burn operation of the engine and for suppressing an EGR amount or inhibiting the EGR is made in accordance with an braking manipulation, the ON/OFF state of a vacuum switch, or an output from a vacuum sensor at the time of lean-burn operation.

6 Claims, 15 Drawing Sheets

FIG. 10

| OPERATION MODE | CONDITION ||||| PROCESSING ||| STATE (MODE) |
|---|---|---|---|---|---|---|---|---|
| | VACUUM SENSOR | VACUUM SHORTAGE | BK-SW | ID-SW | VEHICLE STOP/RUNNING | LEAN-OPERATION INHIBITION | EGR INHIBITION | |
| ENGINE STALL/START | FAULTY | — | — | — | — | × | × | VACUUM SENSOR FAILURE |
| OTHER THAN ENGINE STALL/START | NORMAL | HIGH LEVEL | — | — | RUN | ○ | × | HIGH VACUUM SHORTAGE LEVEL |
| | | | | | STOP | ○ | ○ | |
| | | LOW LEVEL | ON | — | RUN | AFTER IG | × | |
| | | | | | STOP | FOR T1 SECOND AFTER IG | FOR IG PLUS T1 SECOND | |
| | | | — | ON | RUN | FOR T1 SECOND | × | LOW VACUUM SHORTAGE LEVEL AND ID-SW ON |
| | | | | | STOP | FOR T1 SECOND AFTER IG | FOR IG PLUS T1 SECOND | |
| | | NONE | ON | — | RUN | FOR T2 SECOND | × | NO VACUUM SHORTAGE AND BK-SW ON |
| | | | | | STOP | FOR T2 SECOND AFTER IG | FOR IG PLUS T2 SECOND | |

○: PERFORM, ×: NOT PERFORM

LEAN-BURN INTERNAL COMBUSTION ENGINE

BACKGROUND OF THE INVENTION

1. Field of the Invention

The present invention relates to an internal combustion engine having a vacuum actuator operable with use of a vacuum which is taken out of an air intake system of the engine on the side downstream of an intake air amount control mechanism in the air intake system, and more particularly, to an automotive lean-burn engine which ensures a reliable operation of the vacuum actuator at the time of lean combustion in the engine.

2. Related Art

A typical brake mechanism employed in a vehicle utilizes a vacuum (negative pressure) generated in an intake manifold which is disposed on the downstream side of an intake air amount control mechanism in an air intake system of an engine body serving as a driving source for the vehicle. More specifically, the brake mechanism of this kind is provided with a vacuum booster which serves as a vacuum actuator. Upon braking manipulation, the vacuum booster connected to a surge tank which is disposed between the throttle valve and the intake manifold is operated with use of a vacuum generated in the surge tank, to assist the braking manipulation. The vacuum is also utilized to draw a blowby gas from a crank case. The blowby gas is recirculated into the air intake system of the engine, so as not to be discharged to the atmosphere.

Recently, a lean-burn engine which makes an air-fuel mixture supplied to the engine body lean to thereby improve the specific fuel consumption is put into practical use. For example, a lean-burn engine which can make the air-fuel ratio of the mixture lean to a value of about 20 becomes commercially practical, and an in-cylinder injection engine or direct-injection spark ignition engine, belonging to lean-burn engine in a broad sense, also goes into practical use which engine makes the air-fuel ratio leaner than that in the lean-burn engine, i.e., to a value larger than 25, by realizing a stratified charge around a spark plug of the engine.

To be noted, the lean-burn engine in which the air-fuel ratio is set larger than that in an ordinary multi-point injection (MPI) engine is supplied with a large amount of intake air during a lean-burn operation, and hence a reduction in vacuum may occur in the intake system at a location on the downstream side of the intake air amount control mechanism at the time of lean combustion (combustion with a lean air-fuel mixture). Also, in the in-cylinder injection engine which permits an ultra lean air-fuel mixture to be burnt by forming a stratified charge around the spark plug at the ignition timing, with a large amount of intake air supplied to the engine body, there is a possibility that a reduction in vacuum occurs in the intake system during the lean combustion. Especially in an engine provided with an exhaust gas recirculation (EGR) system, an EGR gas is likely to be stayed in the air intake system if the vacuum is reduced, so that the vacuum may be further reduced by the stayed EGR gas.

When the vacuum in the air intake system is largely reduced in this manner, a vacuum actuator sometimes operates unsatisfactorily. For example, in the case of a brake mechanism provided with a vacuum booster, a driver is required to apply increased leg-power to a brake pedal at the time of braking manipulation, if the booster is supplied with a decreased vacuum. For the engine having a vacuum actuator of this kind, therefore, it is important to maintain that vacuum in the air intake system which is observed on the side downstream of the intake air amount control mechanism within such a range as to ensure a satisfactory operation of the vacuum actuator, while taking the operating condition of the engine into consideration.

Japanese Patent Unexamined Publication No. 58-23244, for instance, discloses a technique of ensuring an adequate vacuum in an intake pipe and utilizing the vacuum to operate a vacuum actuator such as a vacuum booster installed in a diesel engine. In this conventional art, a throttle valve is closed when a brake signal is detected, in view of the fact that a reduction in vacuum is caused upon braking operation. Further, Japanese Patent Unexamined Publication No. 6-117280 discloses a technique which detects a pressure on the side downstream of an intake air amount control mechanism by a sensor and which controls operations of a throttle valve and an intake valve in accordance with a detection signal supplied from the sensor. Furthermore, Japanese Patent Unexamined Publication No. 7-247866 discloses a technique in which a motor fan, a compressor or the like which can decrease a vacuum when operated is stopped for a predetermined period of time in response to an output from a pressure sensor.

However, these techniques disclosed in the foregoing publications are not suitably applicable to a lean-burn engine which realizes lean combustion or which realizes a stratified charge followed by ultra lean combustion. If these prior art techniques are simply applied to lean-burn engines, then combustion of lean mixture or ultra lean mixture is unstabilized, resulting in degraded specific fuel consumption and degraded drivability. Further, an adequate vacuum can not be sufficiently ensured.

SUMMARY OF THE INVENTION

An object of the present invention is to provide a lean-burn internal combustion engine which is capable of stabilizing an operation of a vacuum actuator by ensuring a satisfactory vacuum in an air intake system of the engine observed on the side downstream of an intake air amount control mechanism provided in the air intake system, while achieving stabilized lean combustion in the engine, without causing degraded specific fuel consumption and degraded drivability.

According to the present invention, there is provided a lean-burn internal combustion engine which includes an engine body having an air intake system and adapted for a lean combustion operation, an intake air amount control mechanism provided in the air intake system for adjusting an amount of intake air supplied to the engine body, a vacuum actuator operable with use of a vacuum taken out of the air intake system downstream of the intake air amount control mechanism, and combustion control means for operating the engine body to effect the lean combustion in accordance with an operating state of the engine body.

The lean-burn internal combustion engine of the present invention comprises operating state detecting means for detecting an operating state of the engine body, vacuum reduction detecting means for detecting vacuum information relating to a vacuum which acts on the vacuum actuator and for detecting a reduction in the vacuum based on the vacuum information, and vacuum securing means for controlling the intake air amount control mechanism so as to secure the vacuum by decreasing the amount of intake air to decrease air-fuel ratio when the vacuum reduction detecting means detects a reduction in the vacuum at a time of the lean combustion operation of the engine body.

The present invention is advantageous in that the amount of intake air can be corrected to decrease so as to decrease the air-fuel ratio of a mixture supplied to the engine body at the time of the lean combustion operation of the engine body, by operating the vacuum securing means in accordance with the operating state of the engine body and a state of the vacuum observed on the downstream side of the intake air amount control mechanism, whereby a satisfactory vacuum for the vacuum actuator can be ensured without causing a deterioration of the specific fuel consumption and the drivability of the engine.

Preferably, the lean-burn internal combustion engine further comprises exhaust gas recirculation means for recirculating part of an exhaust gas from the engine body to the side of the air intake system downstream of the intake air amount control mechanism. When the vacuum reduction detecting means detects a reduction in the vacuum at the time of the lean combustion operation of the engine body, the vacuum ensuring means controls the exhaust gas recirculation means based on the operating state detected by the operating state detecting means, so as to decrease an amount of exhaust gas recirculation or stop the exhaust gas recirculation.

With this preferable arrangement, a satisfactory vacuum for the vacuum actuator can be ensured immediately and reliably, by controlling the amount of exhaust gas recirculation at the time of the lean combustion operation of the engine body, without causing a degraded exhaust emission characteristic.

Preferably, the vacuum actuator is comprised of a vacuum booster for increasing leg-power acting on a brake pedal. The vacuum reduction detecting means includes at least one of brake manipulation detecting means for detecting, as the vacuum information, a manipulation of the brake pedal and a vacuum switch for detecting, as the vacuum information, a level of the vacuum acting on the vacuum actuator. The vacuum securing means controls the intake air amount control mechanism so as to inhibit the lean combustion operation for a predetermined period of time, when a brake pedal manipulation is detected by the brake manipulation detecting means or when the vacuum level detected by the vacuum switch is lower than a predetermined level.

With this preferred arrangement, when the brake pedal manipulation, indicative of a request for operation of the vacuum actuator (more generally, indicating that the vacuum actuator is in operation), is detected, or when a reduction in the vacuum is detected by the vacuum switch, the lean combustion operation is inhibited for the predetermined period of time, whereby an adequate vacuum required for the vacuum actuator to operate satisfactorily can be always stably and positively maintained with easy. A further satisfactory vacuum can be always obtainable, if the lean-burn engine is so constructed as to newly start a time period for which the vacuum ensuring means is operated to inhibit the lean combustion operation, when a brake pedal manipulation or the like which entails the consumption of the vacuum is newly detected during the operation of the vacuum ensuring means.

Preferably, the lean-burn internal combustion engine further comprises exhaust gas recirculation means for recirculating part of an exhaust gas from the engine body to a side of the air intake system downstream of the intake air amount control mechanism. The vacuum reduction detecting means is comprised of a vacuum sensor for linearly detecting a level of the vacuum acting on the vacuum actuator. The vacuum securing means controls at least one of the intake air amount control mechanism and the exhaust gas recirculation means based on the vacuum level detected by the vacuum sensor and the operating state detected by the operating state detecting means, so as to decrease a corresponding one or both of the intake air amount and the exhaust gas recirculation amount.

With this preferred arrangement, a satisfactory vacuum for the vacuum actuator can be ensured positively by taking a level of shortage of the vacuum into consideration, while suppressing a deterioration of the specific fuel consumption and the drivability of the engine.

In the just-mentioned preferred arrangement, preferably, the engine body is of an in-cylinder injection type which is provided at a cylinder head with a fuel injection valve for directly injecting fuel into a combustion chamber, and which operates, under control of the combustion control means, to effect a changeover between a pre-mixing combustion operation and a stratified combustion operation in accordance with the operating state of the engine body. The exhaust gas recirculation means recirculates a greater amount of exhaust gas at a time of the stratified combustion operation than at a time of the pre-mixing combustion operation. When the level of shortage of the vacuum is determined to be high based on the vacuum level detected by the vacuum sensor, the vacuum securing means controls the intake air amount control mechanism and the exhaust gas recirculation system so as to inhibit the lean combustion operation and to decrease the amount of exhaust gas recirculation or stop the exhaust gas recirculation. When the level of shortage of the vacuum is determined to be low based on the vacuum level, the vacuum securing means selectively operates the intake air amount control mechanism or the exhaust gas recirculation system so as to reduce the amount of the intake air or to reduce the amount of the exhaust gas recirculation or stop the exhaust gas recirculation.

With this preferred arrangement, a control of ensuring a satisfactory vacuum can be made appropriately depending on the level of shortage of the vacuum. In the determination of the vacuum shortage level, it is preferable to determine, based on the vacuum level detected by the vacuum sensor, an absolute value of the vacuum acting on the vacuum actuator and a relative value of the vacuum relative to an atmospheric pressure, and to determine the vacuum shortage level by properly and selectively using the absolute and relative values of the vacuum. Especially, it is advisable to detect a large shortage of the vacuum which directly affects the vacuum actuator operation based on the relative value of the vacuum level detected by the vacuum sensor relative to the atmospheric pressure, and detect a small shortage of the vacuum based on the absolute value of the detected vacuum level. This makes it possible to carry out a fine vacuum control, while preventing an undesired changeover between the pre-mixing combustion operation and the stratified combustion operation, to thereby prevent degraded fuel consumption and degraded drivability.

Preferably, the engine body is of the aforementioned in-cylinder injection type. The exhaust gas recirculation means recirculates a greater amount of exhaust gas at a time of the stratified combustion operation than at a time of the pre-mixing combustion operation. When the level of shortage of the vacuum is determined to be low based on the vacuum level, the vacuum securing means operates the exhaust gas recirculation means so as to reduce the amount of the exhaust gas recirculation or stop the exhaust gas recirculation, and then operates, where required, the intake air amount control mechanism to inhibit the lean combustion operation.

With this preferred arrangement, it is possible to eliminate a shortage of the vacuum, while preventing a deterioration of the specific fuel consumption and the drivability of the engine.

BRIEF DESCRIPTION OF THE DRAWINGS

FIG. 10 is a view showing contents of a vacuum securing control in accordance with a second embodiment of the present invention, which control is carried out in dependence on operating states of a vehicle and an engine mounted thereon, and a shortage level of vacuum;

DETAILED DESCRIPTION OF THE PREFERRED EMBODIMENTS

A lean-burn internal combustion engine in accordance with a first embodiment of the present invention will be explained.

Figure 1:
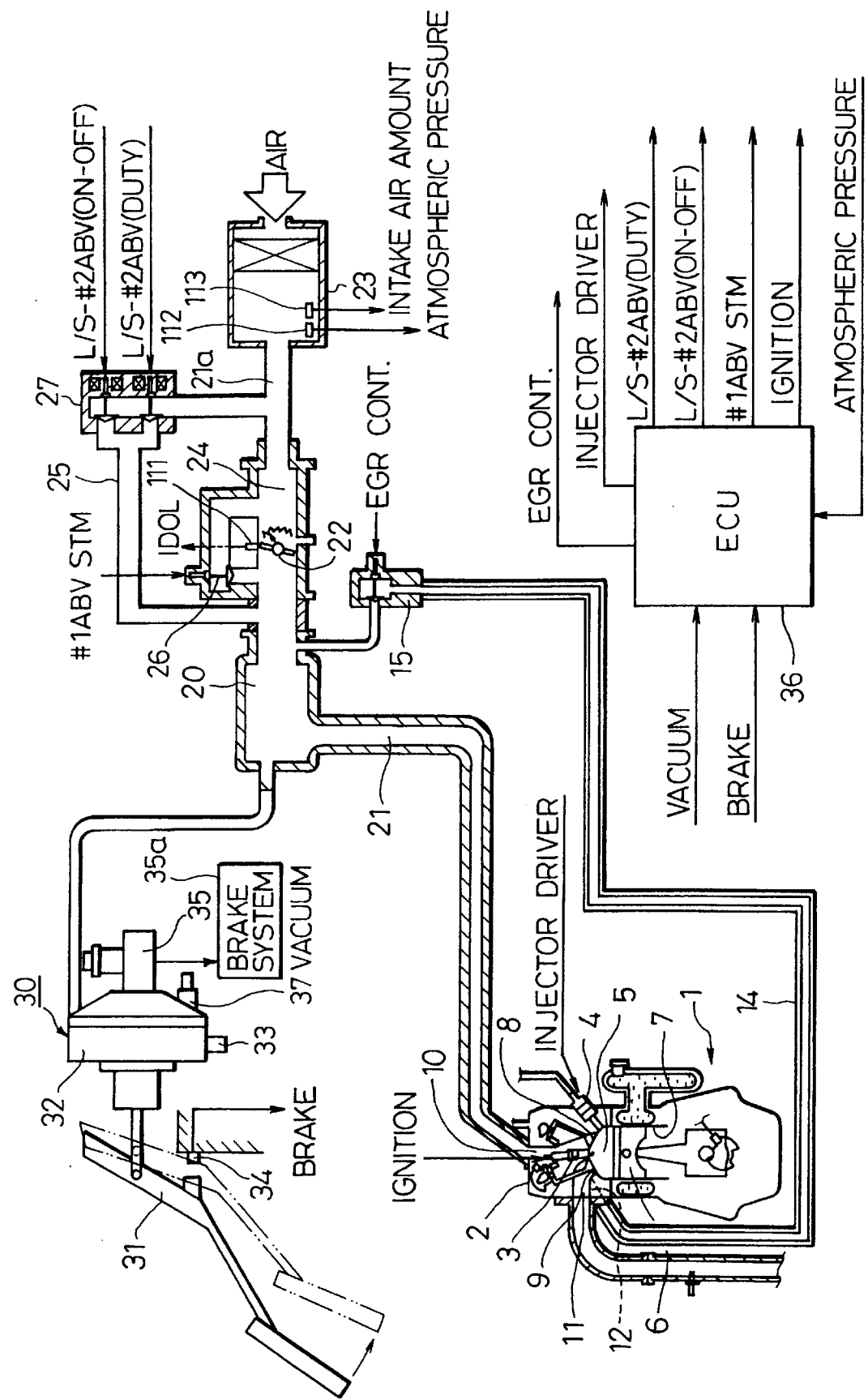
FIG. 1 is a schematic view showing an arrangement of an automotive engine apparatus in accordance with a first embodiment of the present invention.

In FIG. 1, reference numeral 1 denotes a main body of the lean-burn internal combustion engine (hereinafter referred to as engine body). An ignition plug 3 and an electromagnetic fuel injection valve 4 for each cylinder are mounted to a cylinder head 2 of the engine body 1, so that fuel is directly injected into a combustion chamber 5 from the fuel injection valve 4. Numeral 6 denotes a piston which moves vertically in an associated cylinder 7, numerals 8 and 9 denote an intake valve and an exhaust valve associated therewith. An intake port 10 is formed in the cylinder head 2 substantially vertically of the engine at a location between cam shafts which drive the intake valve 8 and the exhaust valve 9, respectively. An exhaust port 11 is formed in a side portion of the cylinder head 2 so as to extend substantially horizontally of the engine. An exhaust gas recirculation port (hereinafter refer to an EGR port) 12 is obliquely branched off from the exhaust port 11.

The intake port 10 of the engine body 1 is connected to an intake pipe 21a through an intake manifold 21 provided with a surge tank 20. The intake manifold 21, the intake pipe 21a and their peripheral elements constitute an air intake system of the engine. An intake air amount control mechanism is provided in the intake pipe 21a. The intake air amount control mechanism comprises a throttle body 24 which defines therein an intake passage accommodating a throttle valve 22 which is, e.g., of a butterfly-type and which opens and closes in response to the operation of the accelerator pedal, and an air bypass pipe 25 which is arranged to bypass the throttle valve 22 of the throttle body 24. The throttle body 24 adjusts an amount of intake air introduced through an air cleaner and then supplies the intake air to the intake manifold 21.

A bypass passage which bypasses the throttle valve 22 is formed in the throttle body 24. A first air bypass valve (#1ABV) 26 is provided in the bypass passage, which controls an intake air amount mainly at the time when the engine is in an idling state. The air bypass pipe 25 has a flow passage area equivalent to that of the intake passage of the throttle body 24 and is provided with a solenoid type second air bypass valve (#2ABV) 27. The first and second air bypass valves 26 and 27 are so adjusted that an auxiliary intake air required in a low/middle speed range of the engine body 1 is supplied therethrough.

The intake manifold 21 having the surge tank 20 is disposed at a location on the downstream side of the intake air amount control mechanism. The surge tank 20 is connected to a brake mechanism 30 which is operable with use of a vacuum (intake pipe pressure) generated in the surge tank as the engine body 1 is operated. The brake mechanism 30 is comprised of a vacuum booster 32 which uses a vacuum introduced from the surge tank 20 to a vacuum chamber (not shown) of the vacuum booster 32 and which increases leg-power applied to a brake pedal 31, a master cylinder 35 for generating a fluid pressure corresponding to the thus increased leg-power, and a brake system 35a which responds to the fluid pressure supplied from the master cylinder 35 to generate a braking force applied to the vehicle. Thus, the vacuum booster 32 constitutes a so-called vacuum actuator. The vacuum used for the vacuum actuator is detected by a vacuum (boost pressure) sensor 37 installed in the vacuum booster 32.

The EGR port 12 is connected to an upstream side (the surge tank 20) of the intake manifold 21 through the EGR pipe 14, so that the exhaust gas discharged from the engine body 1 is partly introduced or recirculated into the surge tank 20, so as to improve the emission characteristic of the engine. An amount of the exhaust gas recirculation is controlled by a step-motor-operated EGR valve 15 interposed in the EGR Pipe 14.

In FIG. 1, reference numeral 36 denotes an engine control unit (ECU) having a central processing unit (CPU), memory devices such as a ROM and a RAM, timer counters, and the like. Reference numeral 111 denotes an idle switch for detecting a substantially fully closed state of the throttle valve 22, and 112 and 113 respectively denote an atmospheric pressure sensor for detecting an atmospheric pressure and an air flow sensor for detecting the amount of intake air supplied to the engine body 1.

Basically, the ECU 36 performs overall control of the engine apparatus in accordance with an operating state of the engine body 1 detected by various sensors, driver's intention indicated by a driving manipulation, and the like. The overall control includes a selection of fuel injection mode, a control of an amount of fuel injection, a control of ignition timing of the ignition plug 3, a determination of an amount of the EGR gas recirculated through the EGR valve 15, and the like. By the ECU 36, an operation of the EGR valve 15, the first air bypass valve (#1ABV) 26 and the second air bypass valve (#2ABV) 27 are controlled in accordance with the operating state of the engine body 1.

Fuel injection modes include a stoichiometric mode in which fuel is injected mainly during the intake stroke and in which a pre-mixing combustion is performed at an air-fuel ratio close to the stoichiometric air-fuel ratio, a first operation mode in which fuel is injected mainly during the intake stroke and a pre-mixing combustion is performed at a ratio leaner than the stoichiometric air-fuel ratio, and a second operation mode in which fuel is injected mainly during the compression stroke and stratified combustion is performed at an air-fuel ratio leaner than that in the first operation mode.

In the lean-burn internal combustion engine which has the vacuum actuator (vacuum booster 32) using the vacuum generated in the intake system 21, 21a on the side downstream of the intake air amount control mechanism (i.e., generated in the intake manifold 21) and which is operated to effect lean combustion in each of the first and second operation modes, the engine according to the present embodiment is featured in that a satisfactory vacuum such as to guarantee reliable operations of the vacuum booster 32 and the brake mechanism 30 is ensured by adjusting a filling state of gases (including intake air and EGR gas) in the intake manifold 21 and in the surge tank 20 disposed at locations on the downstream side of the intake air amount control mechanism, while taking account of the specific fuel consumption and the drivability.

To this end, the ECU 36 detects and monitors the vacuum acting on the vacuum actuator by use of the vacuum (boost pressure) sensor 37 installed in the vacuum booster 32 of the brake mechanism 30. Further, the ECU 36 detects an ON/OFF state of a vacuum switch (V-SW) 33 installed in the vacuum booster 32 of the brake mechanism 30 and an ON/OFF state of a brake switch (BK-SW) 34 for detecting a depressing manipulation of the brake pedal 31. The vacuum switch 33 is in an ON state when the vacuum becomes less than a predetermined value and is in an OFF state when the vacuum is not less than the predetermined value, for instance. In this regard, the ECU 36 detects an ON/OFF state of the vacuum switch 33 as vacuum information relating to the vacuum acting on the vacuum actuator.

The brake switch 34 is in an ON state when the brake pedal 31 is depressed by the driver, and is in an OFF state when the depressing manipulation of the brake pedal 31 is released. The manipulation of the brake pedal indicates a request for operation of the vacuum actuator. More generally, it indicates that the vacuum actuator is in operation. In this respect, the ECU 36 detects an ON/OFF state of the vacuum switch 33 as vacuum information relating to the vacuum acting on the vacuum actuator.

In order to ensure a satisfactory vacuum in the intake manifold 21 (surge tank 20) such as to guarantee the operation of the brake mechanism 30, the ECU 36 performs a vacuum control in accordance with pieces of information including ON/OFF states of the switches 33 and 34, time periods for which the ON states of the switches 33 and 34 continue, an air-fuel ratio (A/F) adjusted by the intake air amount control mechanism, an EGR amount (amount of exhaust gas recirculation), and the like.

As understood from the foregoing and below-mentioned explanations, the ECU 36 has a function of combustion control means for operating the engine body so as to effect lean combustion in accordance with the operating state of the engine body 1, and a function of vacuum securing means for controlling the intake air amount control mechanism so as to decrease the intake air amount when a reduction in vacuum is detected at the time of lean combustion operation of the engine body 1. The ECU 36 cooperates with corresponding ones of the aforementioned various sensors/switches to constitute operating state detecting means for detecting the operating state of the engine body 1 and vacuum reduction detecting means for detecting pieces of vacuum information and detecting a reduction in vacuum based on the vacuum information.

In the following, a vacuum control by the ECU 36 will be explained with reference to an example of a control for inhibiting the lean-combustion operation (hereinafter referred to as lean operation). In the apparatus according to the first embodiment, the lean operation is inhibited when the brake switch 34 or the vacuum switch 33 is in an ON state, for instance. The inhibition of lean operation is cancelled when the inhibition of lean operation is executed for a predetermined time period (for example, two seconds), or when another predetermined time period (for example, 0.5 second) elapses from the time when the vacuum switch 33 was returned to the OFF state before elapse of the predetermined time period.

The inhibition of lean operation is performed by inhibiting the lean injection to the engine body 1 in the first or second operating mode, that is, by returning the fuel injection mode to the stoichiometric mode in which a stoichiometric-combustion operation is carried out. This means that the intake air amount control mechanism, including the second air bypass valve 27, is actuated to close, thereby decreasing the intake air amount so that the air-fuel ratio of a mixture supplied to the engine body 1 decreases.

Upon start of inhibition of lean operation (upon shift from the lean operation to the stoichiometric operation), the amount of fuel injected from the fuel injection valve 4 is controlled so as not to cause a change in the engine output which results in a degraded drivability. For example, a correction is made to increase the fuel injection amount by a quantity required to compensate for a decrease in the intake air amount which entails an increased pumping loss, while maintaining a basic fuel injection amount unchanged. On the contrary, in the case of canceling the inhibition of lean operation (i.e., upon shift from the stoichiometric operation to the lean operation), a correction is made to decrease the fuel injection amount by a quantity corresponding to a decrease in the pumping loss.

Figure 2:
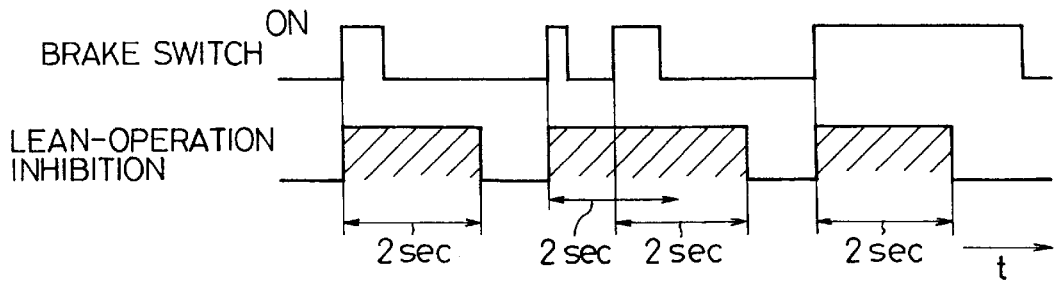
FIG. 2 is a timing chart showing a relation between inhibition of lean operation and an ON/OFF sate of a brake switch in a vacuum securing control for the engine shown in FIG. 1.
Figure 3:
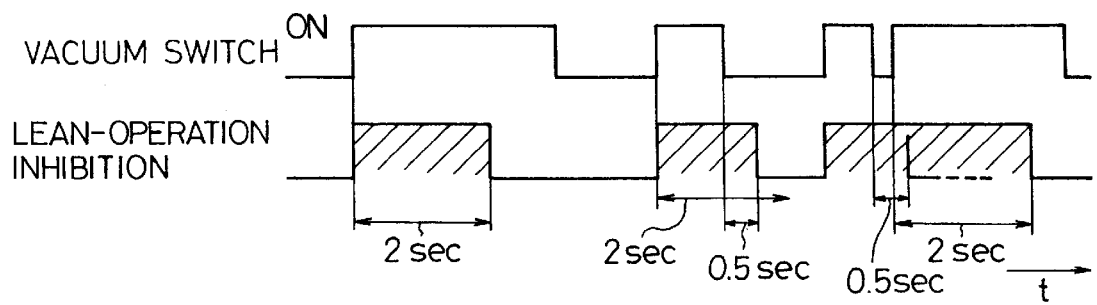
FIG. 3 is a timing chart showing a relation between inhibition of lean operation and an ON/OFF state of a vacuum switch in the vacuum securing control.

More specifically, in respect of the ON/OFF state of the brake switch 34, the lean operation is inhibited for two seconds in a retriggerable manner each time the brake switch 34 is turned ON, as shown in FIG. 2. Further, in respect of the ON/OFF state of the vacuum switch 33, the lean operation is inhibited for two seconds from the moment when the vacuum switch 33 was turned ON, as shown in FIG. 3. If the vacuum switch 33 is returned to the OFF state before elapse of the two-second duration of the lean operation prohibiting mode, this inhibition mode is caused to continue for an additional prohibition time of 0.5 seconds and the prohibition of lean operation is canceled thereafter, to thereby inhibit the lean operation for at least 0.5 seconds when the vacuum switch has been once turned ON.

In the example shown in FIG. 3, when the vacuum switch 33 is turned ON again during the inhibition of lean operation, the two-second duration of the lean-operation inhibiting mode is newly set in a retriggerable manner. However, the retriggering of the lean operation prohibiting mode, i.e., the setting of a new two-second duration may be omitted, provided that the lean operation has already continued for two seconds or more, so as to prevent the prohibition of lean operation from continuing for a period longer than 2.5 seconds which is the sum of the two-second prohibition time and the 0.5-second additional prohibition time.

Figure 4:
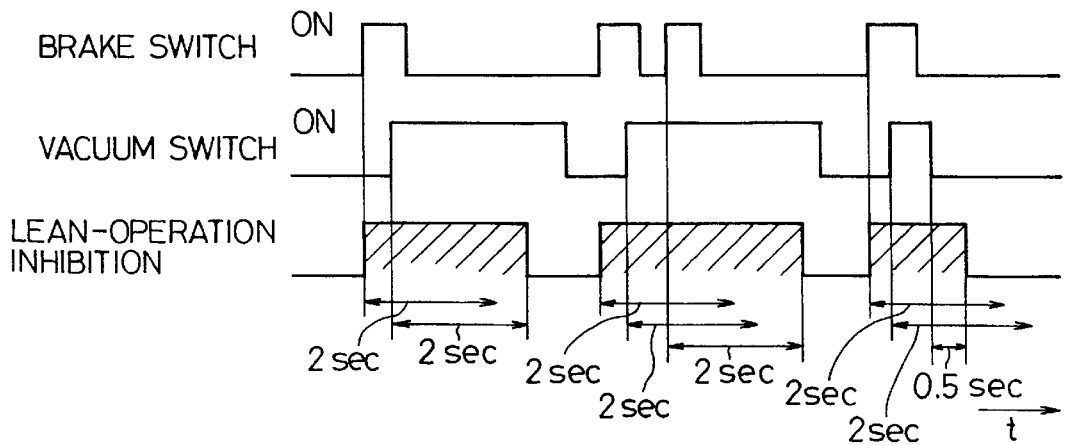
FIG. 4 is a timing chart showing a relation among inhibition of lean operation, an ON/OFF state of the brake switch, and the vacuum switch in the vacuum securing control.
Figure 5:
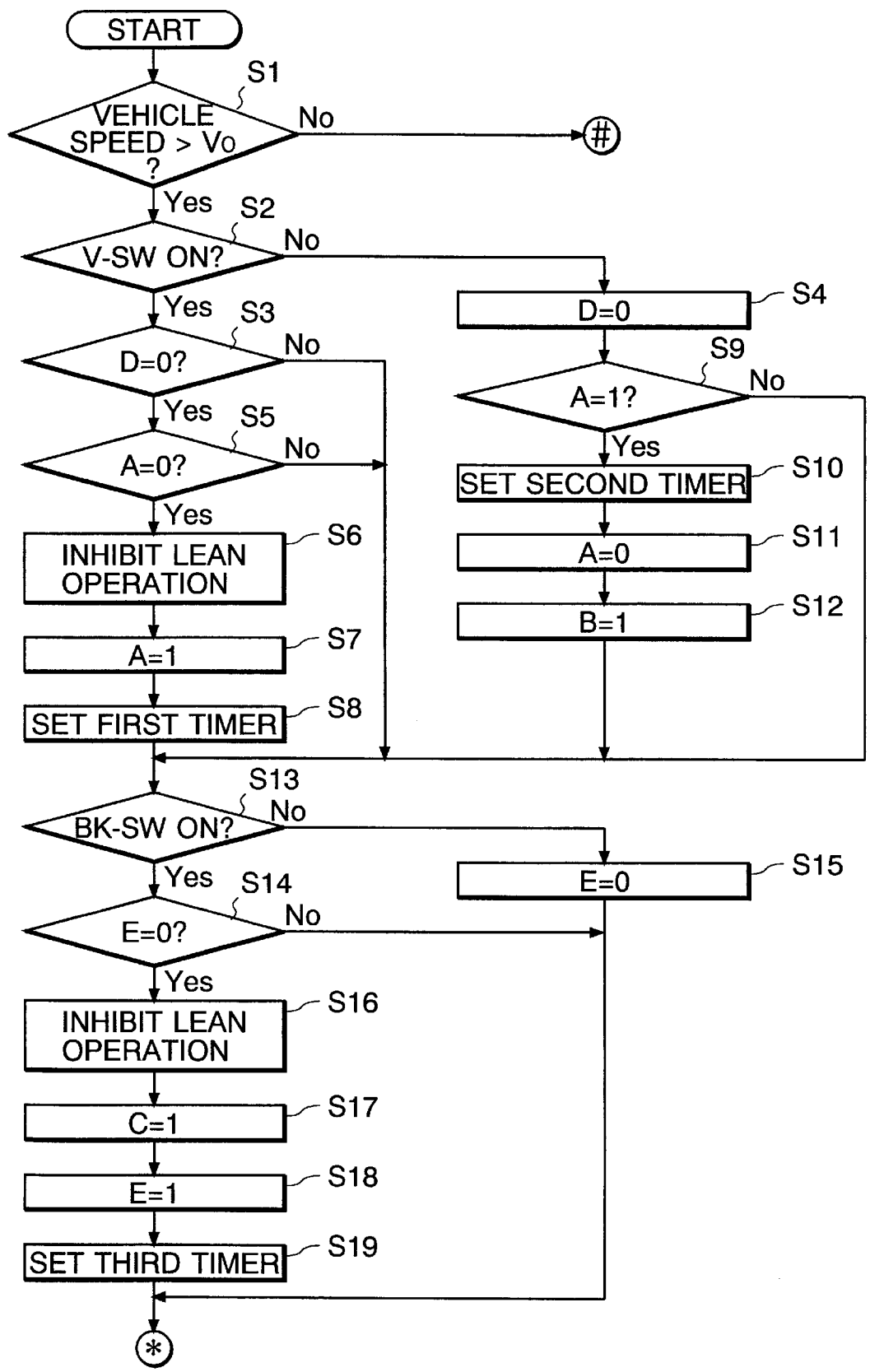
FIG. 5 is a flowchart showing part of procedures of a vacuum securing control in accordance with a first embodiment of the present invention, which part especially relates to the setting of a lean-operation inhibiting mode.

In case that the brake switch 34 and the vacuum switch 33 are used in combination for the vacuum control, the control content varies depending on how to utilize pieces of information detected by the switches 33 and 34, or depending on a control algorithm for the vacuum control. In the vacuum control shown by way of example in FIG. 4, the lean operation is inhibited for two seconds in a retriggerable manner each time the brake switch 34 or the vacuum switch 33 is turned ON. When the vacuum switch 33 is returned to the OFF state during the two-second inhibition of lean operation, the inhibition of lean operation is canceled after the elapse of 0.5 seconds from that time, determining that a vacuum is secured to a degree.

According to the foregoing vacuum securing control, the inhibition of lean operation is started if a reduction in the vacuum in the intake manifold 21 is presumed when the start of the operation of the brake mechanism 30 causing a vacuum reduction is detected by a turning-ON action of the brake switch 34, or if such a reduction in the vacuum is directly determined by a turning-ON action of the vacuum switch 33. As a result, a filling state of gases in the intake manifold 21 is adjusted. Namely, the supply of an abundance of intake air attributable to the lean operation which causes the vacuum in the intake manifold 21 to decrease is interrupted, and a recovery from the decreased vacuum in the intake manifold 21 is achieved by the stoichiometric operation. This makes it possible to secure a satisfactory vacuum which ensures the operation of the brake mechanism 30.

The inhibition of lean operation executed for a period in the order of two seconds only causes a temporal interruption of the lean operation of the engine body 1, so that the lean operation can be regarded as continuing substantially continuously. Therefore, the lean operation prohibition control can be introduced, while enjoying an improved specific fuel consumption achieved by the introduction of the lean operation mode (the first and second operation modes).

In place of or in combination with the aforementioned control of inhibiting the lean operation, a control of suppressing or inhibiting the EGR may be performed in accordance with ON/OFF states of the brake switch 34 and the vacuum switch 33. The EGR for recirculating part of the exhaust gas to the intake manifold 21 can be a cause of difficulty in recovering from a decreased vacuum in the intake manifold 21 or in the vacuum booster 32 attributable to the operation of the brake. In this regard, it is preferable to adjust the filling state of gases in the intake manifold 21 by controlling the EGR valve 15 in accordance with the operating state of the brake mechanism 30 detected by the switches 33 and 34, or the state of the vacuum. More specifically, it is advisable to eliminate a reduced vacuum in the intake manifold 21 caused by the execution of the EGR by reducing the EGR amount or by inhibiting the EGR, thereby maintaining the vacuum in the intake manifold 21 within an appropriate range, so that the operation of the brake mechanism 30 is ensured.

If this EGR reduction/inhibition control is performed basically for two seconds as in the case of the aforementioned lean operation inhibiting control, no substantial deterioration of the exhaust gas purifying ability of the EGR is caused, so that the purifying function of the EGR can be maintained. Particularly, if the EGR amount is reduced or the EGR is inhibited during the lean operation, a vacuum such as to ensure the operation of the brake mechanism 30 can be effectively secured, while enjoying an improved specific fuel consumption achieved by the lean operation. The EGR gas is introduced in large quantities in an injection mode where the fuel injection is performed during the compression stroke. Thus, the EGR reduction/inhibition control is especially effective to a lean-burn internal combustion engine of an in-cylinder injection type having the aforementioned second operation mode for effecting the fuel injection during the compression stroke.

FIGS. 5 to 8 show concrete procedures of a vacuum securing control based on the aforementioned operation principle and executed in the engine of the present embodiment. In this vacuum securing control, the inhibition of the lean operation and the inhibition of the EGR are carried out in accordance with a vehicle speed condition in addition to the ON/OFF states of the vacuum switch 33 and the brake switch 34.

Figure 9:
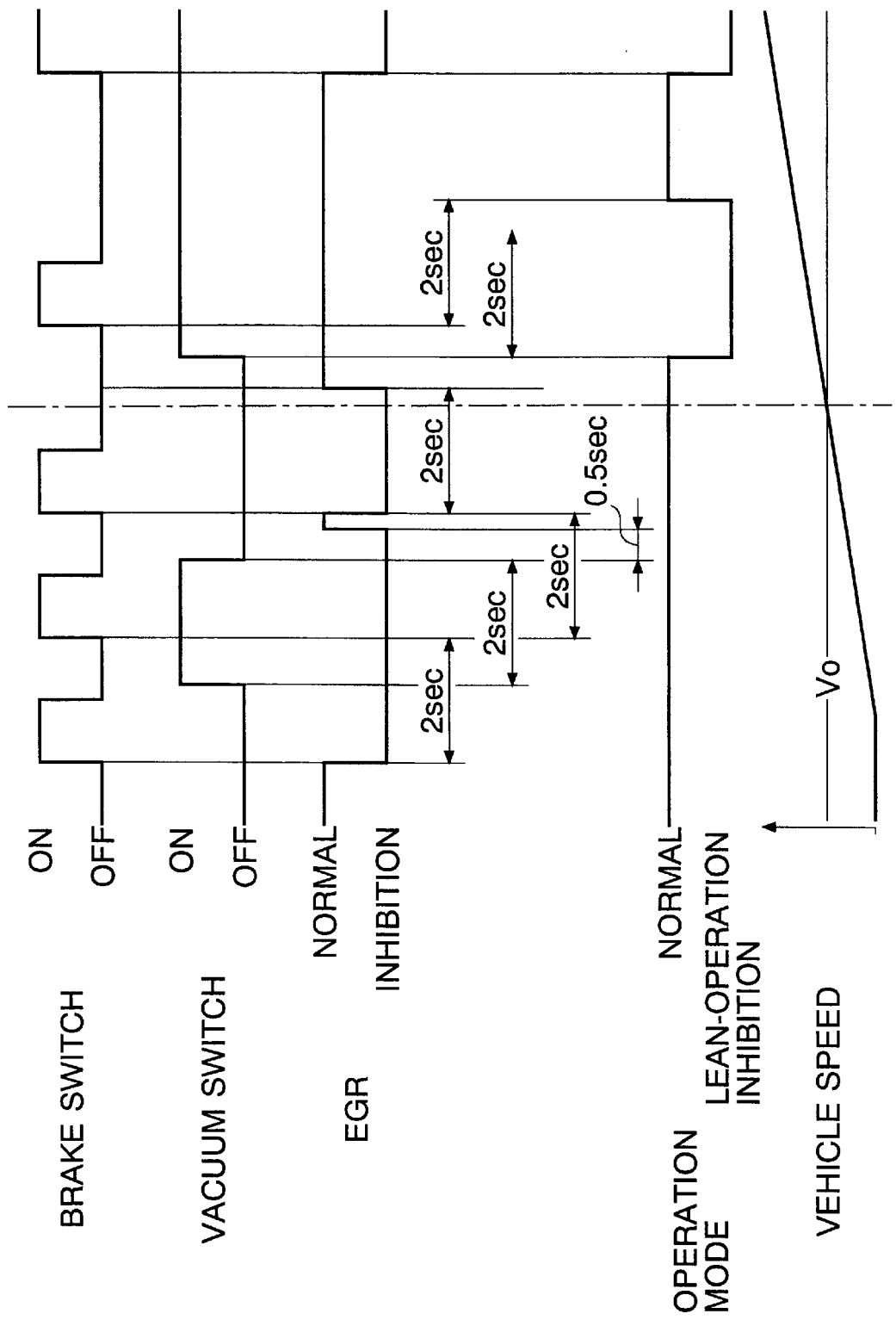
FIG. 9 is a timing chart showing a relation among vehicle velocity, ON/OFF state of a brake switch, ON/OFF state of a vacuum switch, inhibition of EGR, and inhibition of lean combustion operation in the vacuum securing control shown in FIGS. 5 to 8.

More specifically, in the vacuum securing control procedures, as shown in a timing chart of FIG. 9, when the vehicle speed exceeds a predetermined value (for example, a reference speed V0 which is set to a value falling within a range between 2.5 km/h to 20 km/h), the lean operation according to the first or second operation mode is inhibited in accordance with the ON/OFF states of the switches 33 and 34. When the vehicle speed is not more than the reference speed V0, the EGR inhibition control is performed in accordance with the ON/OFF states of the switches. Each of the lean operation inhibiting control and the EGR inhibiting control is performed for a time period of two seconds from the moment when the vacuum switch 33 was turned ON, is performed for a time period of 0.5 second from the moment when the vacuum switch 33 was turned OFF before the elapse of the 2-second period, and is performed for a time period of two seconds from the moment when the brake switch 34 was turned ON.

In the following, the above control procedure will be further explained with reference to FIG. 5 to 9. At first, whether or not the vehicle speed at the present time is more than the reference speed V0 is determined (step S1). If the vehicle speed is more than the reference speed V0, whether or not the vacuum switch (V-SW) 33 is in the ON state is determined (step S2). If the vacuum switch 33 is ON, a determination is made as to whether a flag "D" is at a value of 0 indicating that the vacuum switch 33 is in the OFF state (step S3). This flag "D" indicates whether or not the vacuum switch is in the OFF state and whether or not a vacuum equal to or more than a minimum vacuum required for the brake operation is secured. Specifically, the flag "D" is set at a value of 0 in step S4 when it is determined at step S2 that the vacuum switch 33 is in the OFF state, and is set to a value of 1 at step S44 mentioned later when the lean-operation inhibiting mode has continued for a predetermined time period (for example, two seconds) so that a sufficient vacuum is provably secured. Meanwhile, the vacuum switch 33 is in actual so designed as to be turned ON when the vacuum decreases to a threshold value which is larger than the minimum vacuum value. In other words, the threshold value is determined in a manner giving a margin for reliable brake operation.

Accordingly, when the flag "D" set at the value of 0 is determined in step S3 despite that the ON state of the vacuum switch 33 is detected at step S2, it is confirmed that the vacuum switch 33 has changed from the OFF state to the ON state between the preceding cycle and the present cycle of this control routine.

If a changeover from the OFF state to the ON state of the vacuum switch 33 is detected in this manner, a determination is made with regard to a flag "A" which indicates whether or not the lean-operation inhibiting mode has been set (step S5). If the flag "A" is at a value of 0 indicating that no lean-operation inhibiting mode is set, then the lean-operation inhibiting mode is set (step S6), the flag "A" is at a value of 1 indicative of the lean-operation inhibiting mode (step S7), and a first timer is set for an initial count value (step S8). The first timer manages a time period for which the lean-operation inhibiting mode is executed, which mode is caused to start in response to the detection of the ON state of the vacuum switch 33. The initial count value is equal to a value obtained by dividing a predetermined period for which the inhibition mode is to be continued, e.g., two seconds, by a time interval at which the control routine is executed.

The first timer and the below-mentioned other timers are so designed as to perform a countdown action although no countdown processes associated therewith are not illustrated in FIGS. 5 to 8. In the case of employing a count-up timer in place of the countdown timer, the initial count value of 0 is set at step S8.

If it is confirmed at step S5 that the flag "A" is already set to a value of 1, the procedures of the steps S6 to S8 are skipped.

On the other hand, if it is confirmed at step S2 that the vacuum switch 33 is in the OFF state, so that the flag "D" is set at step S4 to a value of 0 indicative of the OFF state of the vacuum switch, a determination is made as to whether the flag "A" is at a value of 1 indicative of the setting of the lean-operation inhibiting mode (step S9). If the flag "A" is determined to be at the value of 1 so that the lean-operation inhibiting mode is already set, a second timer is set for an initial count value, obtained by dividing a predetermined time period, e.g., 0.5 seconds, by the time interval of execution of the control routine (step S10), in order to cause the lean-operation inhibiting mode to further continue for the predetermined time period from the moment when the vacuum switch 33 is turned OFF. Then, the flag "A" is set to a value of 0 (step S11), and a flag "B" is set to a value of 1 indicative of the lean-operation inhibiting mode after the turning-OFF action of the vacuum switch 33 (step S12). If it is determined at step S9 that no lean-operation inhibiting mode is set, the steps S10 to S12 are skipped.

According to the above-mentioned process of steps S2 to S12, the setting of the lean-operation inhibiting mode in the case of the vehicle speed greater than the reference speed V0 is made in accordance with the ON/OFF states (changeover between these two states) of the vacuum switch 33. Namely, the setting for decreasing the intake air amount by actuating the intake air amount control mechanism, especially the second air bypass valve 27, to the closing direction is made, followed by the setting of flags "A", "B" and "C" and the setting of the first and second timers.

Next, whether or not the brake switch (BK-SW) 34 is in the ON state is determined (step S13). If the brake switch 34 is in the ON state, a determination is made as to whether a flag "E" is at a value of 0 indicative of the OFF state of the brake switch 34 (step S14). The flag "E" is set to the value of 0 when it is confirmed at step S13 that the brake switch 34 is in the OFF state (step S15). Despite that the ON state of the brake switch 34 is detected at step S13, if it is confirmed at the next step S14 that the flag "E" is at the value of 0, then it is detected that the brake switch 34 has changed from the OFF state to the ON state between the preceding cycle and the present cycle of the control routine.

If a changeover from the OFF state to the ON state of the brake switch 34 is detected, then, in response to this, the lean-operation inhibiting mode is set (step S16), and a flag "C" is set to a value of 1 indicative of the lean-operation inhibiting mode at the time of braking operation for the case in which the vehicle speed is higher than the reference speed V0 (step S17). Next, the flag "E" is set to a value of 1 (step S18), and then a third timer is set for a predetermined time period of, e.g., two seconds. The third timer is used to manage a time period for which the lean-operation inhibiting mode is executed, which mode is set in response to the detection of the ON state of the brake switch 34 (step S19).

As apparent from the processing procedures of steps S13 to S19, the predetermined time period of two seconds is set each time the ON state of the brake switch 34 is detected during repetitive ON/OFF actions, if any, of the brake switch 34 attributable to the pumping manipulations of the brake pedal. As a result, the predetermined time period for the lean-operation inhibiting mode is restarted from the moment when the ON state of the brake switch 34 is newly detected.

In the meantime, if it is confirmed at step S14 that the flag "E" is already set to a value of 1, the procedures of the steps S16 to S19 are skipped.

According to the procedures shown in steps S13 to S19, the lean-operation inhibiting mode for the case where the vehicle speed exceeds the reference speed V0 is set in response to the ON/OFF state (changeover from the OFF state to the ON state) of the brake switch 34, followed by the setting of the flags "C" and "E" and of the third timer.

Figure 6:
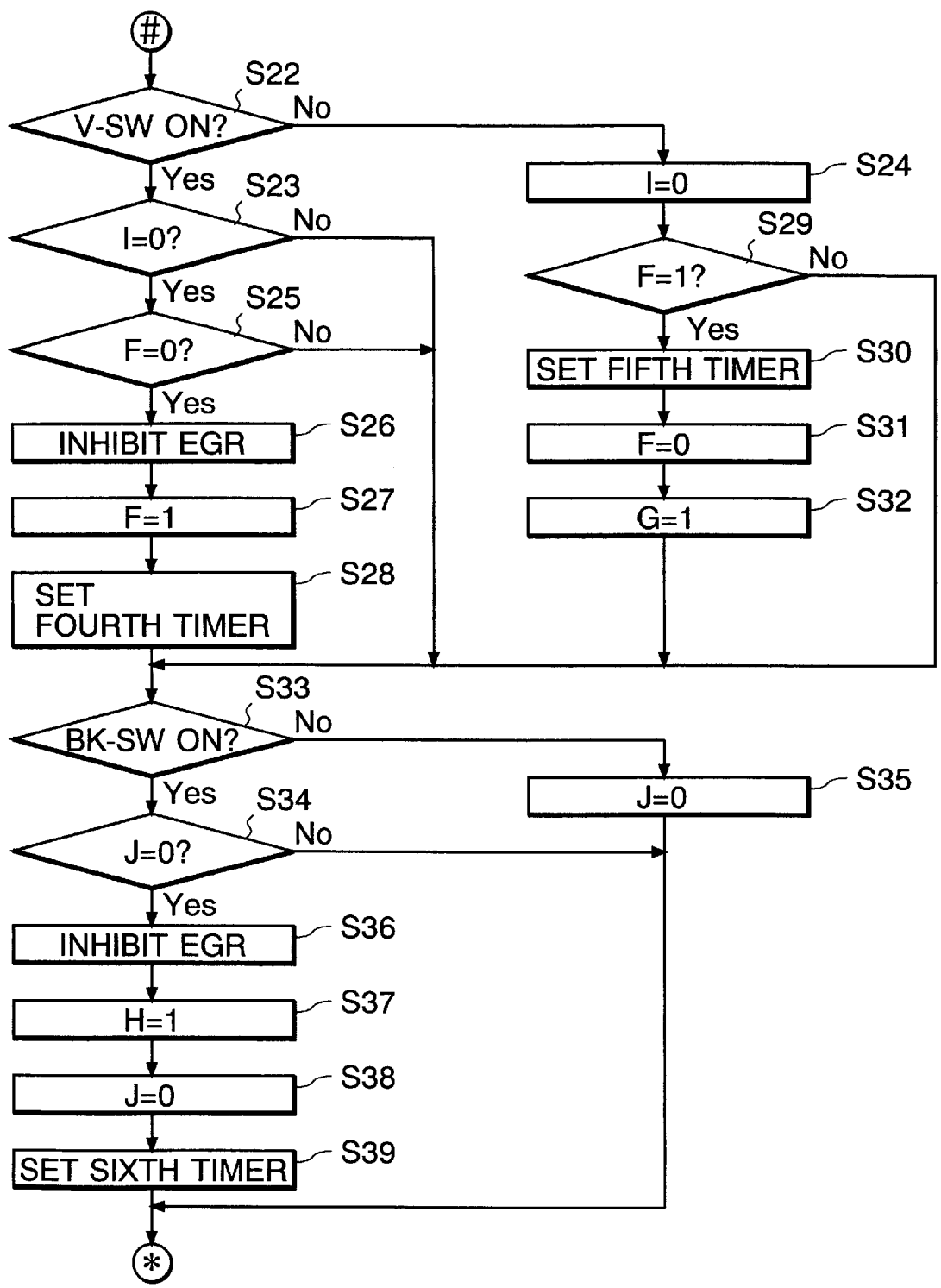
FIG. 6 is a flowchart showing another part of procedures of the vacuum securing control, which part follows FIG. 6 and especially relates to the setting of an EGR inhibition mode.

On the other hand, if it is confirmed at step S1 that the vehicle speed is less than the reference speed V0, an EGR inhibition mode is set in accordance with the ON/OFF states of the vacuum switch 33 and the brake switch 34, as shown in FIG. 6, in place of the setting of the lean-operation inhibiting mode. Basically, the EGR inhibition control is made in a similar manner to the foregoing procedures of steps S2 to S19. Namely, the processing procedures of steps S22 to S39 shown in FIG. 6 are executed. However, in this case, flags "F", "G", "H", "I" and "J" are used in place of the flags "A", "B", "C", "D" and "E", respectively. Further, fourth to sixth timers are used in place of the first to the third timers, respectively.

Briefly speaking, when a changeover from the OFF state to the ON state of the vacuum switch 33 is detected, the EGR inhibition mode is entered and the measurement, by the fourth timer, of a time period for which the EGR inhibition mode is actually continued is started (steps S23 to S28). If the vacuum switch 22 is turned OFF before cancellation of the EGR inhibition mode, then the time measurement by the fifth timer is started (steps S24 to S32). Moreover, when the brake switch 34 changes from the OFF state to the ON state, the EGR inhibiting mode is entered, and the measurement by the fourth timer in respect of a time period for which the EGR inhibiting mode is actually continued is started (steps S34 to S39).

Figure 7:
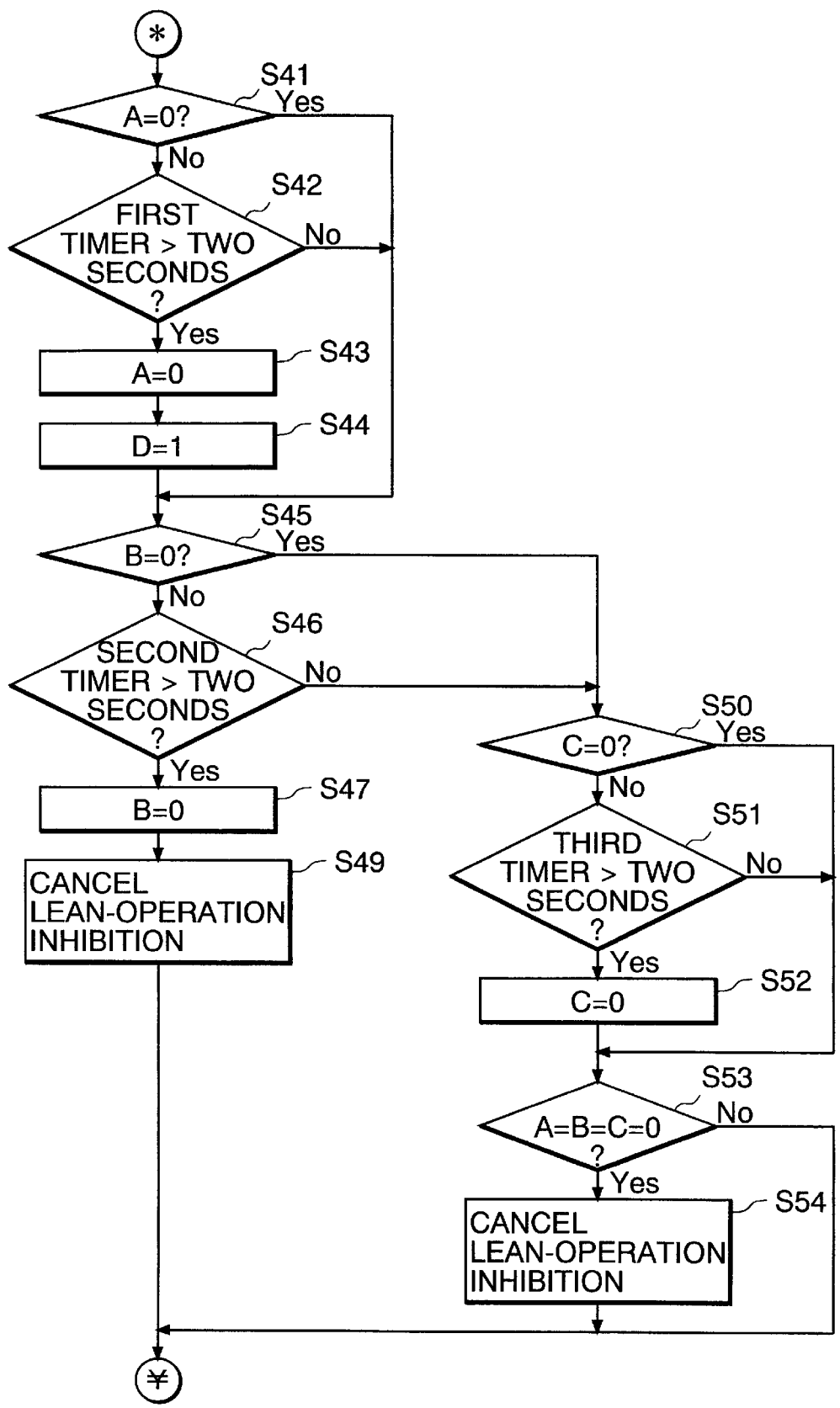
FIG. 7 is a flowchart showing still another part of procedures of the vacuum securing control, which part follows FIG. 5 and especially relates to the cancellation of the lean-operation inhibiting mode.
Figure 8:
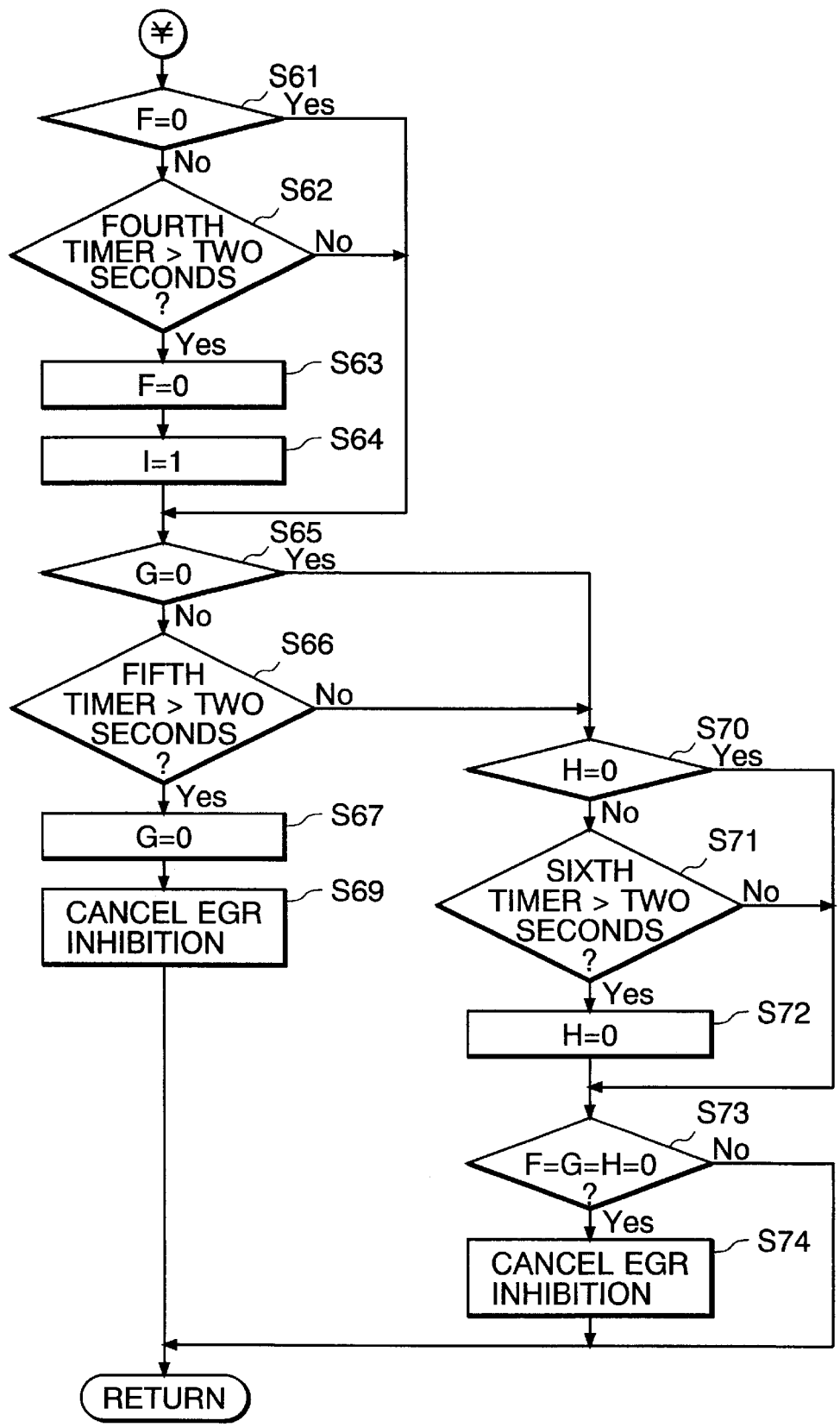
FIG. 8 is a flowchart showing the remaining part of procedures of the vacuum securing control, which part follows FIG. 7 and especially relates to the cancellation of the EGR inhibition mode.

After completion of the processing in the present control cycle in connection with the setting of the lean operation inhibition and the EGR inhibition effected in accordance with the vehicle speed and the ON/OFF states of the vacuum switch 33 and the brake switch 34, control processing shown in FIGS. 7 and 8 is performed in respect of cancellation of the lean operation inhibition and the EGR inhibition.

In the inhibition-mode canceling control, at first, a determination is made as to whether or not the flag "A" is at a value of 0 indicative of non-setting of the lean-operation inhibiting mode (step S41). If the result of this determination is NO, that is, if the flag "A" is at a value of 1 indicating that the lean-operation inhibiting mode is set in response to the turning-ON action of the vacuum switch 33, whether or not the lean-operation inhibiting mode already continues for two seconds is determined based on the time period measured by the first timer (step S42). If the lean-operation inhibiting mode already continues for two seconds, then the flag "A" is set to a value of 0 indicative of cancellation of the lean-operation inhibiting mode (step S43) and the flag "D" is set to a value of 1 indicating that a satisfactory vacuum is ensured (step S44). If it is determined at step S41 that the flag "A" is at the value of 0 indicating that the lean-operation inhibiting mode responsive to the turning-ON action of the vacuum switch 34 is not set, or if it is determined at step S42 that the time period measured by the first timer does not exceed two seconds, the subsequent processing is entered, without performing the flag setting processes of steps S43 and S44.

Thereafter, whether or not the flag "B" is at the value of 0 is determined (step S45). If the result of this determination is NO, i.e., if it is determined that the flag "B" is at the value of 1 indicative of the lean-operation inhibiting mode after the turning OFF of the vacuum switch 33, then a determination is made as to whether or not a time period, measured by the second timer, for which the inhibition of lean operation has continued exceeds 0.5 seconds (step S46). If the time period measured by the second timer exceeds 0.5 seconds, the flag "B" is set to the value of 0 indicative of cancellation of the lean-operation inhibiting mode after the turning OFF of the vacuum switch (step S47), and then the lean-operation inhibiting mode is canceled (step S49).

On the other hand, if the flag "B" is at the value of 0 indicative of cancellation of the lean-operation inhibiting mode after the turning OFF of the vacuum switch, or if the time period, measured by the second timer, for which such inhibition mode has continued does not exceed 0.5 seconds even though the flag "B" is at the value of 1 indicating that the vacuum switch 33 has been turned OFF, then the flag "C" is checked to see whether or not the lean-operation inhibiting mode in association with the turning-ON action of the brake switch 34 is set (step S50). If the flag "C" is at a value of 1 indicative of the lean-operation inhibiting mode, a determination is made as to whether or not the lean-operation inhibiting mode has continued for a time period equal to or more than two seconds based on the result of time measurement by the third timer (step S51). When it is determined that two seconds or more have elapsed, the flag "C" is set to a value of 0 indicative of the cancellation of the lean-operation inhibiting mode which was set in response to the turning-ON action of the brake switch (step S52).

If the flag "C" is set to the value of 0 in this manner or if the time period for which the lean-operation inhibiting mode has continued, measured by the third timer, does not exceed the two seconds, with the flag "C" being 1, then it is determined whether or not the flags "A", "B" and "C" are at a value of 0 (step S53). When it is confirmed that all the flags "A", "B" and "C" are at 0, the lean-operation inhibiting mode is canceled (step S54).

As described above, the lean-operation inhibiting mode is canceled after the lean-operation inhibiting mode set in response to the turning-ON action of the vacuum switch 33 continues for two seconds or more, or after the lean-operation inhibiting mode set in response to the turning-ON action of the brake switch 34 continues for two seconds or more, or after the lean-operation inhibiting mode continues for 0.5 seconds from the moment when the vacuum switch 33 was turned OFF.

The EGR inhibition mode set in the aforementioned manner is canceled in accordance with a determination process shown in steps S61 to S74 in FIG. 8 which is similar to the procedure shown in steps S41 to S54. Specifically, depending on results of determinations in respect of the flags "F", "G" and "H", that time period which is measured by a corresponding one of the fourth to sixth timers is checked. The EGR inhibition mode is canceled if it is confirmed that the EGR inhibition mode set in response to the turning-ON action of the vacuum switch 33 or the brake switch 34 continues for two seconds or more, or that the EGR inhibition mode continues for 0.5 seconds or more after the vacuum switch 33 is turned OFF.

According to the above-mentioned procedure (control process), the lean operation or the EGR is inhibited in accordance with the vehicle speed, thereby controlling the filling state of gases (including intake air and EGR gas) in the intake manifold 21 (surge tank 20), whereby a vacuum which ensures the operation of the brake mechanism 30 can be secured. Thus, a required vacuum can be easily and effectively secured, without the need of providing a vacuum generating apparatus such as a vacuum pump. Further, the inhibition of lean operation or EGR set in response to the detected turning-ON action of the vacuum switch 33 and that set in response to the detected turning-ON action of the brake switch 34 are managed independently of each other by use of different timers. Further, the period for which the inhibition of lean operation or EGR after the turning-OFF action of the vacuum switch 33 continues is managed by use of a further different timer. The above-mentioned control under the timer-management in respect of cancellation of the lean operation and the cancellation of the EGR makes it possible to carry out an effective vacuum control in response to the ON/OFF states of the switches 33 and 34.

In particular, the lean-operation inhibition and the EGR inhibition each of which is continuously performed for a predetermined time period after the turning OFF action of the vacuum switch 33 makes it possible to recover the vacuum to a level sufficiently higher than a threshold value in respect of the ON/OFF action of the vacuum switch 33. Thus, undesired repetitive ON and OFF actions of the vacuum switch 33 can be prevented. As a consequence, a vacuum required for ensuring the operation of the brake mechanism 30 can be secured in a stable manner.

In the first embodiment mentioned above, a detection to see whether or not the vacuum applied to the vacuum booster (vacuum actuator) 32 from the intake manifold 21 is at a sufficient level for ensuring the operation of the booster is made with use of the vacuum switch 33, and, based on the result of the detection, a combustion control for the engine body 1 (control of a filling state of gases in the intake manifold 21) is performed for vacuum control. However, it is possible to replace the vacuum switch 33 by a vacuum sensor 37 for linearly (in an analogue manner) detecting the vacuum in a vacuum chamber (not shown) of the vacuum booster 32. In this case, the aforementioned combustion control for vacuum control is carried out on the basis of a detected result indicative of a vacuum level.

That is, it is possible to determine the degree of shortage of the vacuum from the vacuum level detected by the vacuum sensor 37, to thereby perform a control of inhibiting the lean operation or suppressing or inhibiting the EGR in accordance with the determined result. More specifically, an optimum combustion mode may be set in accordance with the degree of shortage of the vacuum and the vehicular or engine operating states observed at that time. This makes it possible to prevent a frequent changeover of the combustion mode, for instance, whereby a vacuum required to operate the vacuum actuator can be obtained, without causing a deterioration of the drivability of the engine and the vehicle.

FIG. 10 is a table showing the contents of a vacuum securing control according to a second embodiment of the present invention created from the aforementioned point of view, in which the control content varies independence on the vacuum shortage level and the operating state (stop/running state) of the vehicle which represents, in a broad sense, the engine operating state.

Specifically, upon start of the engine or at the time of unintentional engine stall, the lean-operation inhibiting control and the EGR inhibiting control are not performed. If the vacuum sensor 37 is faulty or is presumed to be faulty, only the lean-operation inhibiting control is performed. In a failure determination for the vacuum sensor 37 in the case that the vacuum sensor 37 is operated at 5 volts, the vacuum sensor 37 is determined to be normal if a sensor output voltage varies within a range of 0.2 to 4.5 volts, whereas the sensor is faulty if the sensor output voltage falls outside the above range.

During a normal operation of the engine body 1 other than at the time of engine start or engine stall, if the vacuum sensor 37 normally operates, the level (degree) of shortage of the vacuum is determined in accordance with the output from the vacuum sensor 37.

The vacuum sensor 37 of the present embodiment detects an absolute pressure, i.e., an absolute value of that negative pressure or vacuum which is generated in the air intake system and introduced into the vacuum booster 32 as the engine body 1 operates and which varies in dependence on the operating state of the engine body. When the vacuum sensor 37 operates normally, it outputs an output voltage Bv which indicates the difference between the detected absolute pressure and the standard atmospheric pressure and which varies between 0.2 V and 4.5 V, for instance. In addition to the leg-power, a difference between a vacuum supplied to the vacuum booster (vacuum actuator) 32 and an atmospheric pressure acts on the master cylinder 35. In view of the above circumstances, in the present embodiment, a state in which the degree of shortage of the vacuum is large is determined from the relative value of the vacuum relative to the atmospheric pressure, whereas a state in which the degree of shortage of the vacuum is small is determined from the absolute value of the vacuum.

To this end, a fault determination for the vacuum sensor 37 is carried out by determining whether or not the vacuum sensor output Bv falls within the range ranging from 0.2 volt to 4.5 volt.

In case that the vacuum sensor 37 is determined to operate normally, a vacuum Bvr acting on the vacuum actuator is determined from the vacuum sensor output Bv and an output Av of the atmospheric pressure sensor 112.

Since the vacuum sensor output Bv (on a pressure basis) indicates the difference between the standard atmospheric pressure (760 mmHg) and the absolute pressure P, the vacuum Bvr which is the difference between the atmospheric sensor output Av (on a pressure basis) and the absolute pressure P is represented by:

$$Bvr=Av-P=Av-(760\ mmHg-Bv)=Av+Bv-760\ mmHg.$$

Since the standard atmospheric pressure (one atmosphere; 760 mmHg) is given as a constant, the relative pressure Bvr may be determined as:

$$Bvr=Av+Bv.$$

In the two equations, two conversion coefficients for respectively converting the output voltages of the atmospheric pressure sensor and the vacuum sensor into corresponding pressure values are omitted.

The relative pressure Bvr is compared with a predetermined determination value B2 (B2s) to determine the level of shortage of the vacuum. When the relative pressure Bvr is smaller than the determination value B2 (B2s), it is determined that the level of shortage of the vacuum is high. Further, the absolute value of the vacuum (absolute pressure) Bv represented by the output of the vacuum sensor 37 is compared with another predetermined determination value B1 (B1A, B1s and B1sA) to directly determine the level of the vacuum in the vacuum booster 32.

As for the determination levels B1, B1A, B2, B1s, B1sA, B2s, the suffix 1 is affixed to those used for the absolute-pressure basis determination, the suffix "2" is affixed to those used for the relative-pressure basis determination, the suffix "s" is affixed to those for the determination at the time of vehicle stop, and the suffix "A" is affixed to those for the determination at the time when auxiliary equipment is in use.

If the absolute pressure Bv is lower than the determination value B1 (B1A, B1s and B1sA), the level of shortage of the vacuum is determined to be low. In this case, in order to secure the vacuum in the vacuum booster 32, a control of changing the operation mode of the engine body 1 is carried out. More specifically, a vacuum securing control is performed by inhibiting the lean operation and the EGR, as in the case of the first embodiment. Particularly, in accordance with the operating state of the engine body 1, that is, whether the vehicle is in a running state or in a stop state, a control of inhibiting the lean operation or the EGR is performed.

In the following, the vacuum securing control will be explained with reference to FIGS. 11 to 17.

Figure 11:
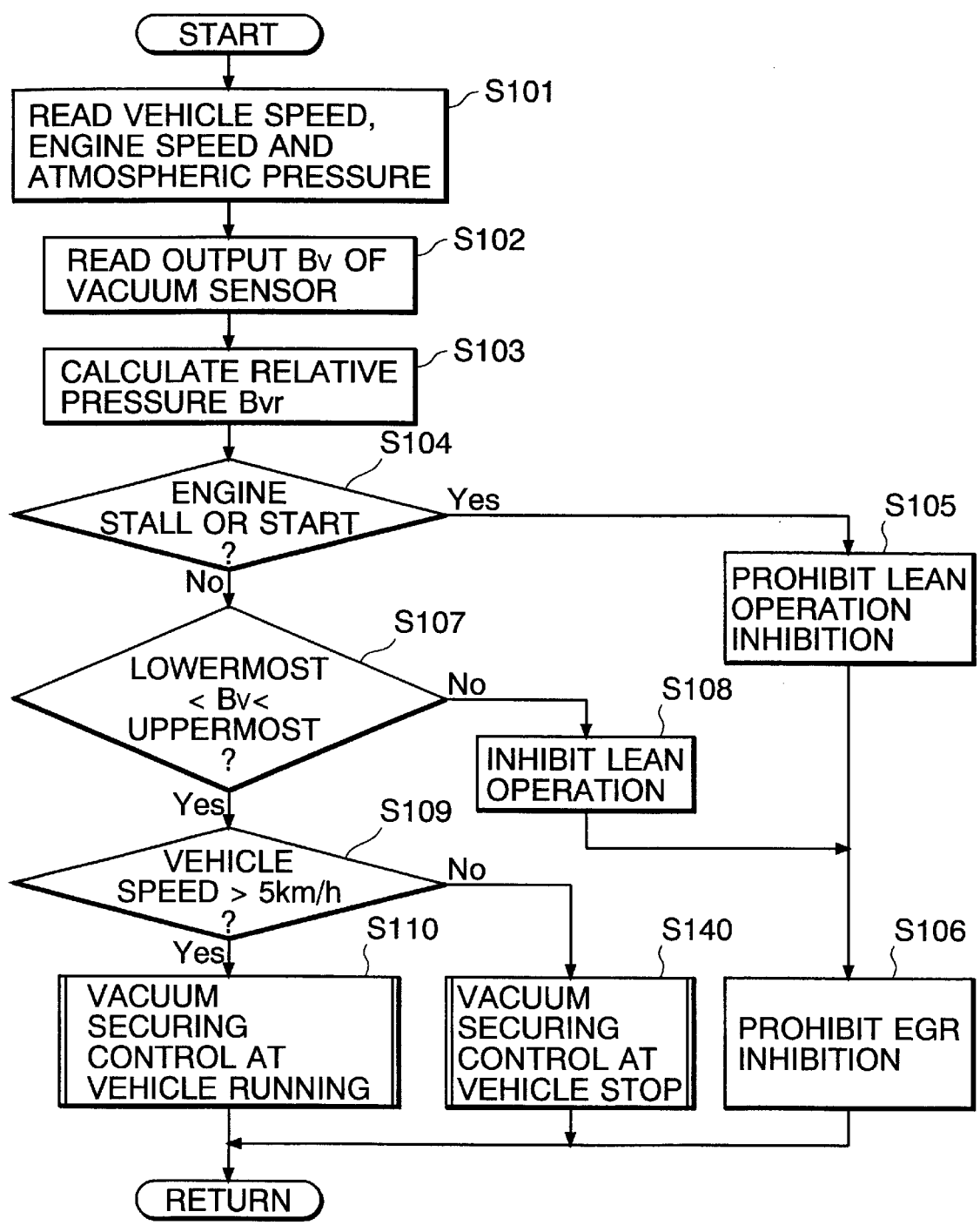
FIG. 11 is a flowchart of a main routine of the vacuum securing control in accordance with the second embodiment of the present invention.

As shown in the main routine in FIG. 11, the vehicle speed V, the engine rotation speed Ne, and the atmospheric pressure Av are first detected (step S101). Next, the output Bv of the vacuum sensor 37 is detected (step S102), and the relative pressure Bvr between the vacuum level Bv in the vacuum booster 32 and the atmospheric pressure Av is calculated (step S103).

Next, whether or not the engine is in a stalled state or in a starting state is determined (step S104). The determination is performed by, for example, checking the state of the ignition switch and the like. If it is determined that the engine body 1 is in a stalled or starting state, the program returns to step S101, without performing both the lean-operation inhibiting control and the EGR inhibiting control (steps S105 and S106). Accordingly, no vacuum securing control is performed, whereas an air-fuel ratio control, an EGR control and the like are performed in accordance with the engine operating condition.

If the engine is not in a stalled or starting state, a determination is made as to whether or not the output voltage of the vacuum sensor 37 falls within a normal range ranging from 0.2 V to 4.5 V, to thereby determine whether or not the vacuum sensor 37 operates normally (step S107). If the vacuum sensor 37 is faulty, a lean-operation inhibiting control is performed to secure a necessary vacuum for safety (step S108). In the lean-operation inhibiting control, the amount of intake air is caused to reduce, as in the case of the first embodiment. In this case, a target air-fuel ratio is set at a value close to the stoichiometric air-fuel ratio, and an amount of fuel injection is controlled to maintain the air-fuel ratio at the target ratio, while preventing a degraded drivability, that is, preventing a substantial variation in the engine output. By inhibiting the lean operation of the engine body 1, while permitting the engine operation in the stoichiometric control mode, a required vacuum is secured in the intake manifold and in the vacuum actuator. In this case, no EGR inhibiting control is performed (step S106).

As a result of the determination at step S107, if it is confirmed that the vacuum sensor 37 is normally operated, whether or not the vehicle is stopped is determined (step S109). In this determination, whether or not the vehicle speed is equal to or higher than, e.g., 5 km/h is determined. If the vehicle speed V is less than the determination speed, it is determined that the vehicle is in a stop state or a similar state. If the result of the determination at step S109 is YES, that is, if the vehicle is determined to be in a running state, a vacuum securing control at the time of vehicle running is performed (step S110). If the vehicle is in a stop state (or in a similar state where it runs at a very low speed) is determined, a vacuum securing control at the time of vehicle stop is performed (step S140). Namely, in accordance with the operating state of the vehicle (engine body 1), a vacuum securing control subroutine at the time of vehicle running or at the time of vehicle stop is entered (step S110 or S140).

Figure 12:
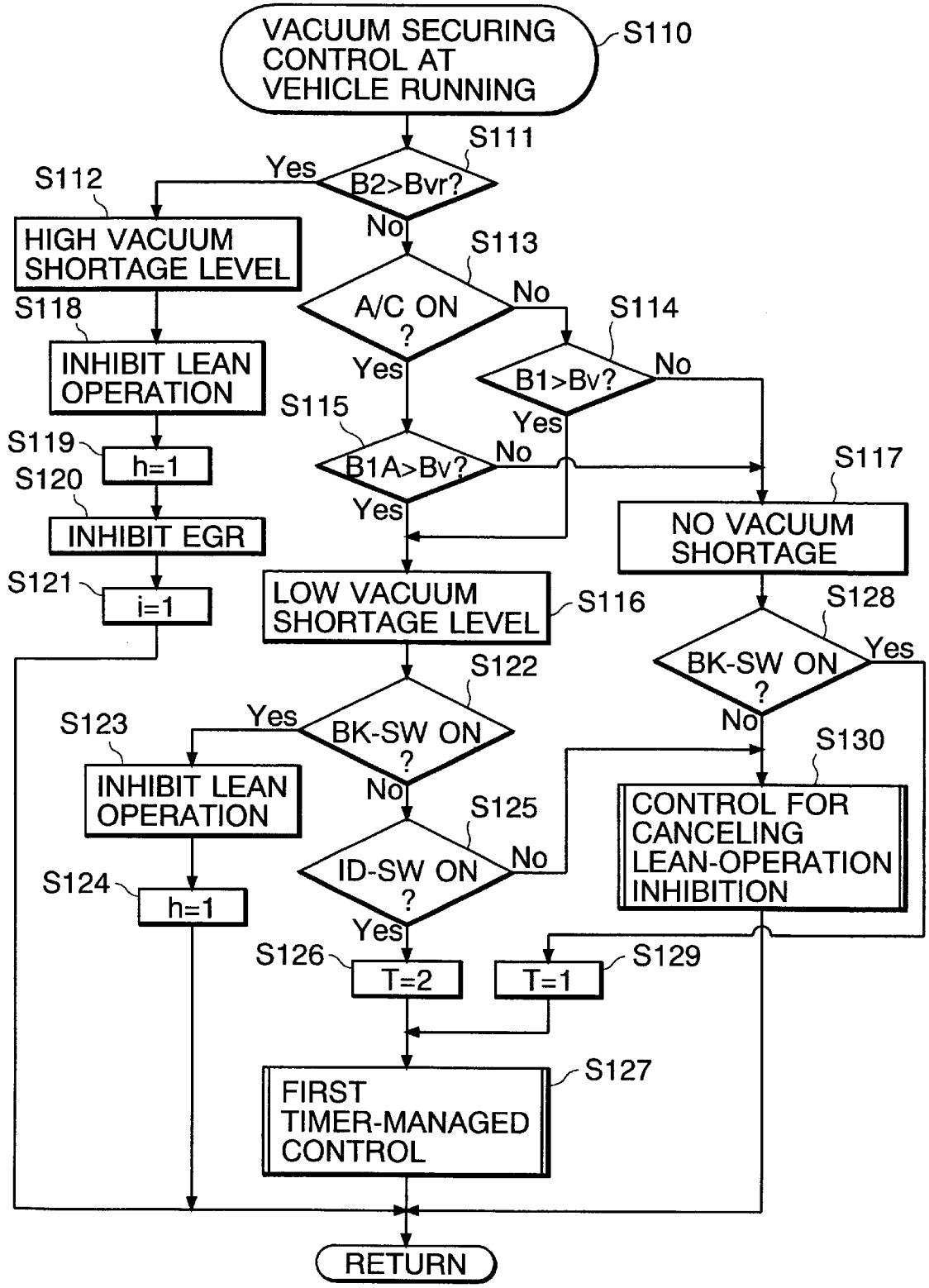
FIG. 12 is a flowchart of a vacuum securing control subroutine at the time of vehicle running in the vacuum securing control shown in FIG. 11.

The lean-operation inhibiting control at the time of vehicle running (step S110) is performed in accordance with a flowchart shown, by way of example, in FIG. 12. In this subroutine, the relative pressure Bvr determined in the above described manner is compared with a predetermined determination level B2 (step S111). When the relative pressure Bvr is lower than the determination level B2, that is, the vacuum is small in magnitude, it is determined that the degree or level of shortage of the vacuum is large (step S112).

On the other hand, if the relative pressure Bvr is determined to be higher than the determination level B2 or if the vacuum shortage degree is not large, whether or not auxiliary equipment such as an air conditioner serving as a load for the engine body 1 is in an ON state is determined (step S113). Depending on whether or not the auxiliary equipment is ON, the vacuum level (absolute pressure) Bv indicated by the output of the vacuum sensor 37 is compared with a corresponding one of the predetermined determination levels B1 and B1A (steps S114 and S115). If the absolute pressure Bv is lower than the corresponding determination level B1 or B1A, it is determined that the degree of shortage of the vacuum is small (step S116). This indicates that a sufficient vacuum is not secured although a vacuum required for actuating the vacuum actuator is secured to a certain degree. If the absolute pressure Bv is determined to be higher than the associated determination level B1 or B1A, this determination result indicates that a sufficient vacuum is secured in the vacuum booster 32. In other words, no shortage of the vacuum is determined (step S117).

The foregoing determination levels B1, B1A and B2 as well as the determination levels B1s, B1sA and B2s used for the below-mentioned determinations are set in accordance with the operating state such as the engine speed Ne and the vehicle speed V, these determination levels being given in the form of map data, for instance. As mentioned above, those determination levels affixed with the suffix "1" relate to the absolute-pressure basis determination, those affixed with the suffix "2" relate to the relative-pressure basis determination, those having the suffix "s" relate to the determination at the time of vehicle stop, and those having the suffix "A" relate to the determination at the time when auxiliary equipment is in use.

If it is determined at step S112 that the level of shortage of the vacuum in the running state is high, a lean-operation inhibiting mode is set where a lean-operation inhibiting control is performed (step S118). Specifically, if the engine is in an lean operation to effect a corresponding one of the aforementioned pre-mixing combustion according to the first operation mode and the aforesaid stratified combustion according to the second operation mode, such a lean operation per se is inhibited, and a flag "h" is set at a value of 1 indicative of execution of the lean-operation inhibiting control (step S119). Then, an EGR inhibiting control is performed (step S120), and a flag "i" is set at a value of 1 indicative of execution of the EGR inhibiting control (step S121).

The lean-operation inhibiting mode is set in an attempt to secure a satisfactory vacuum in, e.g., the intake manifold 21 by the inhibition of the lean operation. As a result, a vacuum at a level sufficient for the operation of the brake is secured in the vacuum booster 32. Then, until the later-mentioned control for canceling the inhibition of lean operation is performed, the lean-operation inhibiting mode is maintained.

On the other hand, if it is determined at step S116 that the level of shortage of the vacuum is low, whether or not the brake switch (BK-SW) 34 is in an ON state is determined (step S122). Namely, whether or not a depression manipulation of the brake pedal is being made so that a braking operation using the vacuum is being performed is determined. If the brake switch 34 is ON, the lean-operation inhibiting mode is set (step S123), and the flag "h" is set to a value of 1 indicative of the lean-operation inhibiting mode (step S124).

If the brake switch is OFF, whether or not the throttle valve 22 is in a substantially fully closed state is further determined based on an ON/OFF state of the idle switch (ID-SW) 111 which becomes ON when the throttle valve 22 is such a closed state (step S125). If it is confirmed that the idle switch 111 is ON, i.e., if the engine is in an idling state, a parameter T for timer management associated with the lean-operation inhibiting control is set to a predetermined time period, e.g., two seconds (step S126), and the lean-operation inhibiting control under a first timer-management is performed (step S127).

Figure 13:
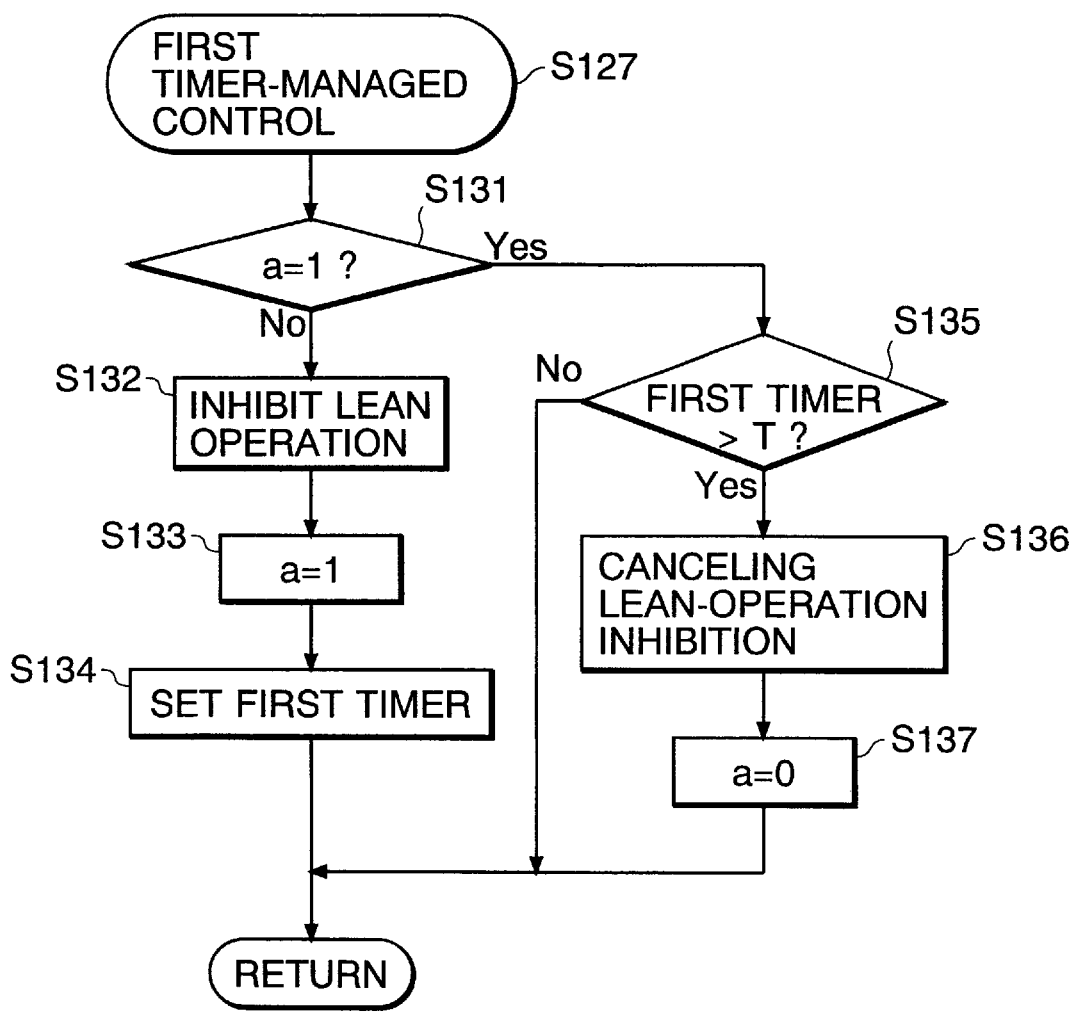
FIG. 13 is a flowchart showing procedures of a first timer-managed control in the subroutine shown in FIG. 11.

In the first timer-managed lean-operation inhibiting control (the step S127), as shown in FIG. 13, whether or not a flag "a" is at a value of 1 indicative of execution of the first timer-managed lean-operation inhibition (stepS131). If the flag "a" is not at the value of 0, the lean-operation inhibiting control is started (step S132), and the flag "a" is set at a value of 1 (step S133). Next, the measurement, by a timer, of a time period elapsed from the start of the lean-operation inhibiting control is started (step S134). Then, a determination is made as to whether or not the time period measured by the timer reaches a predetermined timer-management period represented by the aforementioned parameter T (step S135).

The lean-operation inhibiting control is canceled when the timer-management period has elapsed (step S136). In this case, the flag "a" is set to a value of 0 indicative of cancellation of the lean-operation inhibiting control (step S137), and the program returns to the main routine shown in FIG. 11 and hence to the vacuum securing control subroutine shown in FIG. 12.

In the subroutine shown in FIG. 12, if it is determined at step S117 that there is no shortage of vacuum, the ON/OFF state of the brake switch 34 is determined (step S128). If the brake switch 34 is in the ON state, the parameter T is set to a predetermined period, for example, one second (step S129), and a control for inhibiting the lean-operation as a vacuum securing control is performed, as in the aforementioned lean-operation inhibiting control (the step S127).

Figure 17:
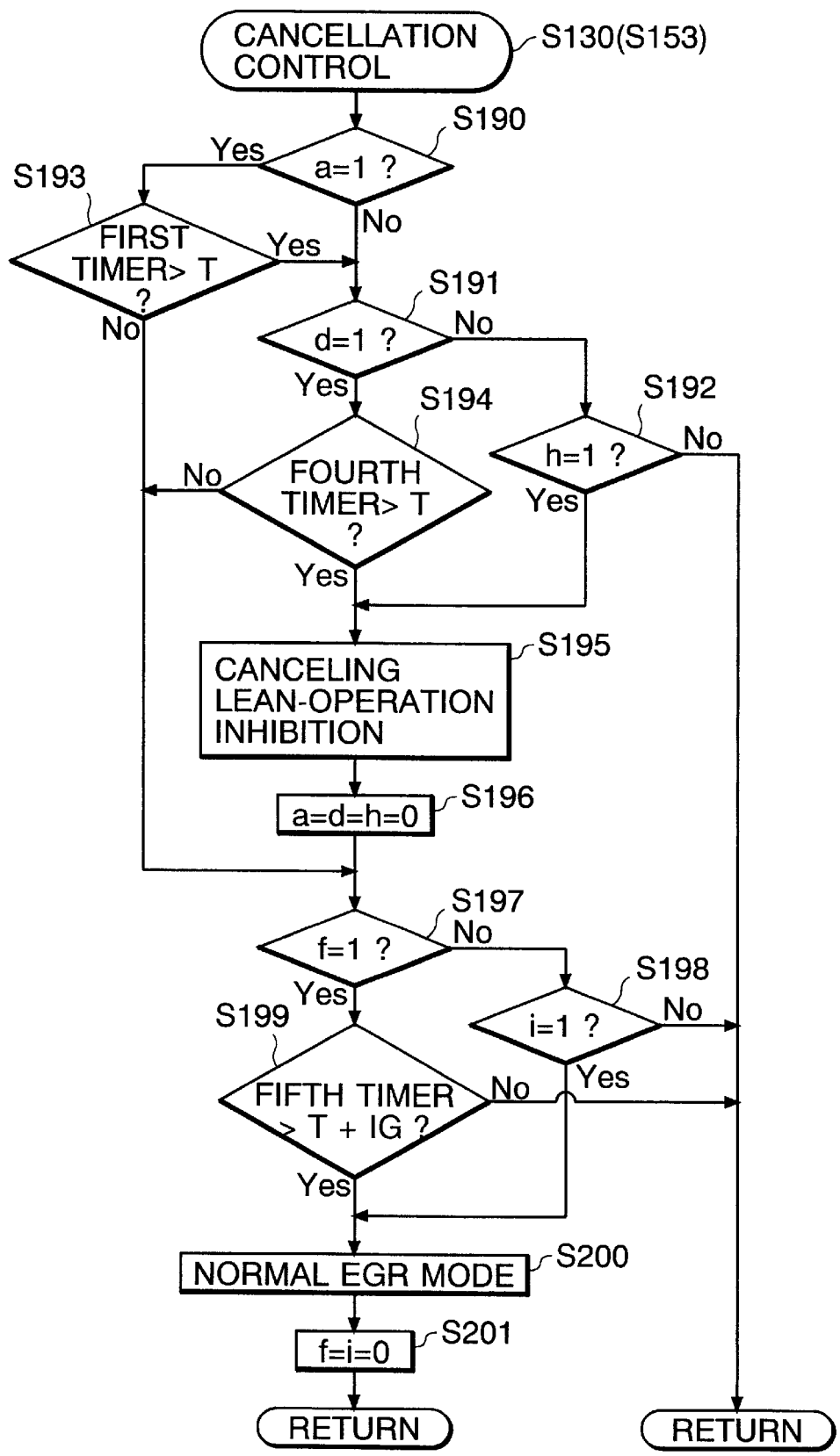
FIG. 17 is a flowchart showing procedures of the cancellation of prohibition of lean operation shown in each of FIGS. 12 and 14.

In case that the idle switch is not ON (the step S125), or if the brake switch is not ON under a condition that no shortage of the vacuum is found, the lean-operation inhibiting mode is canceled (step S130). A process of canceling the lean-operation inhibiting mode and a process of canceling a similar inhibiting mode in the below-mentioned vacuum securing control at the time of vehicle stop are performed as shown in FIG. 17. These processes will be mentioned later.

Figure 14:
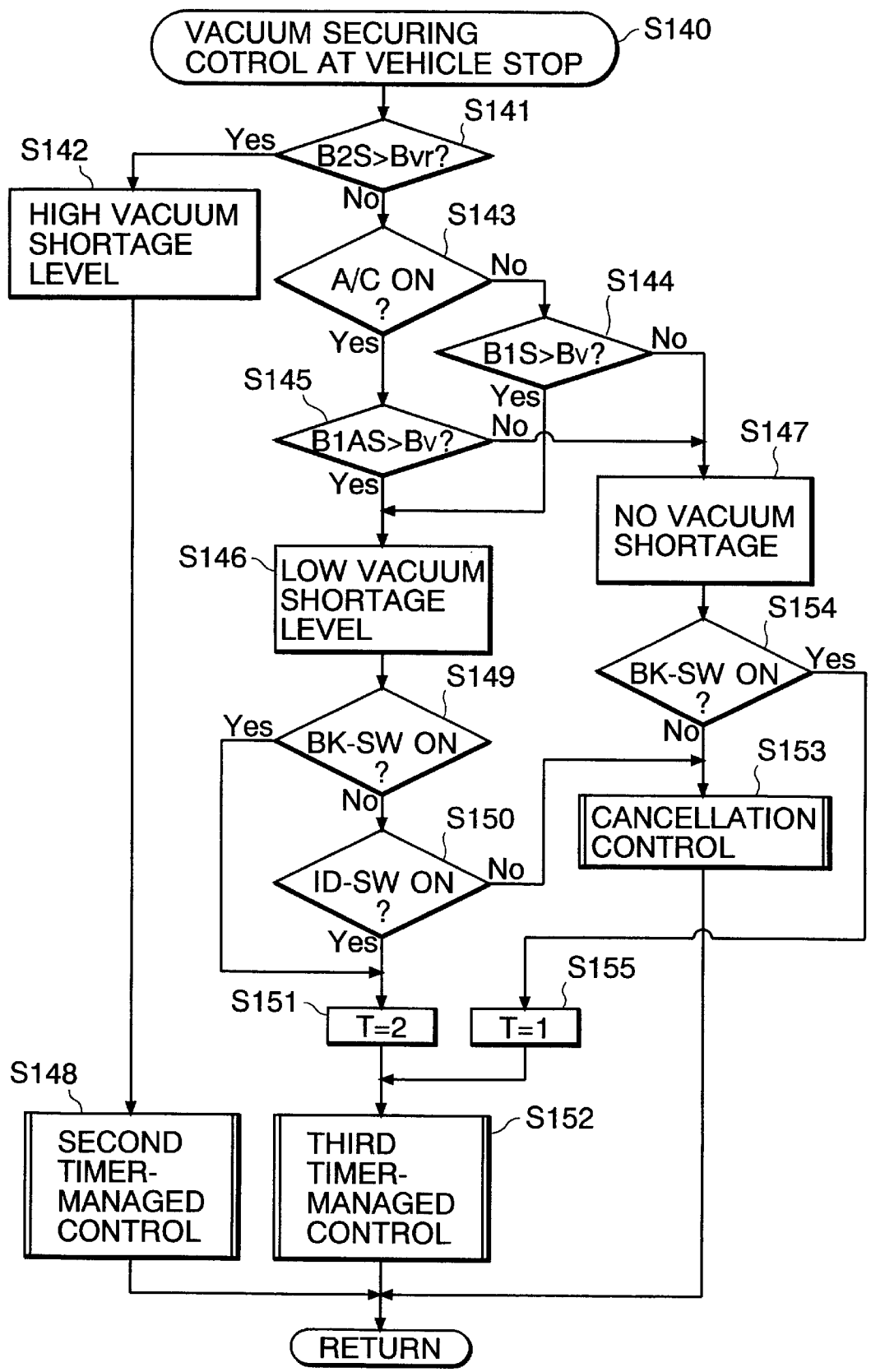
FIG. 14 is a flowchart showing procedures of a vacuum securing control subroutine at the time of vehicle stop in the vacuum securing control shown in FIG. 11.

If it is determined at the running-mode determining step S109 that the vehicle is in a stop state, on the other hand, a vacuum securing control at the time of vehicle stop is performed, as shown in FIG. 14 (step S140). In this control, the degree of shortage of the vacuum is determined, as in the case of the vacuum securing control at the time of vehicle running. Specifically, a relative pressure Bvr calculated in the above manner is compared with a predetermined determination level B2s (step S141). If the relative pressure Bvr is lower than the determination level B2s, the degree or level of shortage of vacuum is determined to be large (step S142).

If the relative pressure Bvr is higher than the determination level B2s, whether or not the auxiliary equipment is ON is determined (stepS143). Depending on the determination result, the vacuum level (absolute pressure) Bv is compared with a corresponding one of predetermined determination levels B1s and B1sA (steps S144 and S145). When the absolute pressure Bv is lower than the associated determination level B1s or B1sA, it is determined that the level of shortage of the vacuum is low (step S146). If the absolute pressure Bv is higher than the determination level B1s or B1sA, it is determined that there is no shortage of vacuum (step S147).

Figure 15:
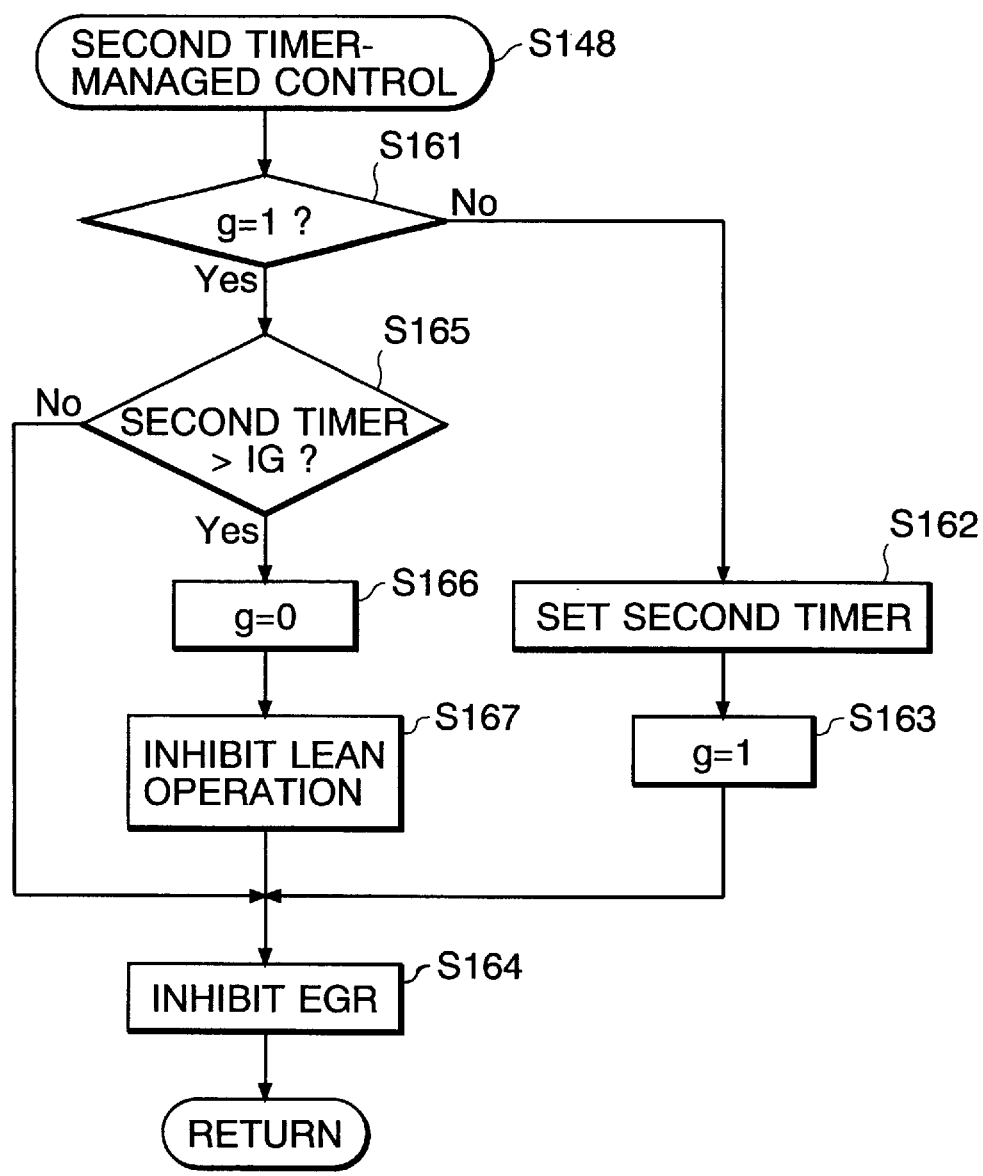
FIG. 15 is a flowchart showing procedures of a second timer-managed control in the subroutine shown in FIG. 14.

At the time of vehicle stop, if the vacuum shortage level is determined to be high (step S142), a vacuum securing control under a second timer-management is carried out, as shown in FIG. 15 (step S148). Specifically, in the vacuum securing control, whether or not a flag "g" associated therewith is at a value of 1 indicative of execution of the control is determined (step S161). If the flag "g" is not at the value of 1, then the measurement, by a second timer, of a period for which the inhibition of the EGR is executed is started (step S162), and the flag "g" is set at a value of 1 indicative of the measurement by the second timer (step S163). In this case, the EGR inhibition is started (step S164), and the program returns to the main routine of FIG. 11 and hence to the subroutine shown in FIG. 14.

After returning to the subroutine of FIG. 14 again in the next control cycle, whether or not the period measured by the second timer exceeds a predetermined combustion stroke time period (predetermined EGR inhibiting time period) IG is determined (step S165). If the predetermined EGR inhibiting time period IG has passed, the flag "g" is set to a value of 0 indicative of completion of EGR inhibition (step S166), and the lean-operation inhibiting control is performed (step S167). Specifically, after the degree of shortage of the vacuum at the time of vehicle stop is determined to be large, the vacuum securing control by the EGR inhibition is performed, and then, after elapse of the predetermined EGR inhibiting time period, the lean-operation inhibiting control is started.

If the level of shortage of vacuum is determined to be low (step S146), on the other hand, whether or not the brake switch (BK-SW) 34 is ON is determined (step S149), and whether or not the idle switch (ID-SW) is ON is determined (step S150). If the brake switch 34 is ON, or if the brake switch 34 is OFF but the idle switch is ON, a parameter T for timer management is set to two seconds (step S151) and the lean-operation inhibiting control under a third timer-management is performed (step S152). Further, if the brake switch 34 is OFF and the idle switch is OFF, a process of canceling the lean-operation inhibiting mode is performed (step S153).

Even if it is determined at step S147 that there is no shortage of vacuum, whether or not the brake switch 34 is ON is determined (step S154). When the ON state of the brake switch indicative of a braking manipulation is detected, the parameter T for timer management is set to one second (step S155), and the lean-operation inhibiting control under a third timer-management is performed (step S152). If it is determined at step S154 that the brake switch 34 is OFF, on the other hand, a process for canceling the lean-operation inhibiting mode is performed (step S153), as in the same manner as that in the aforesaid step S130.

Figure 16:
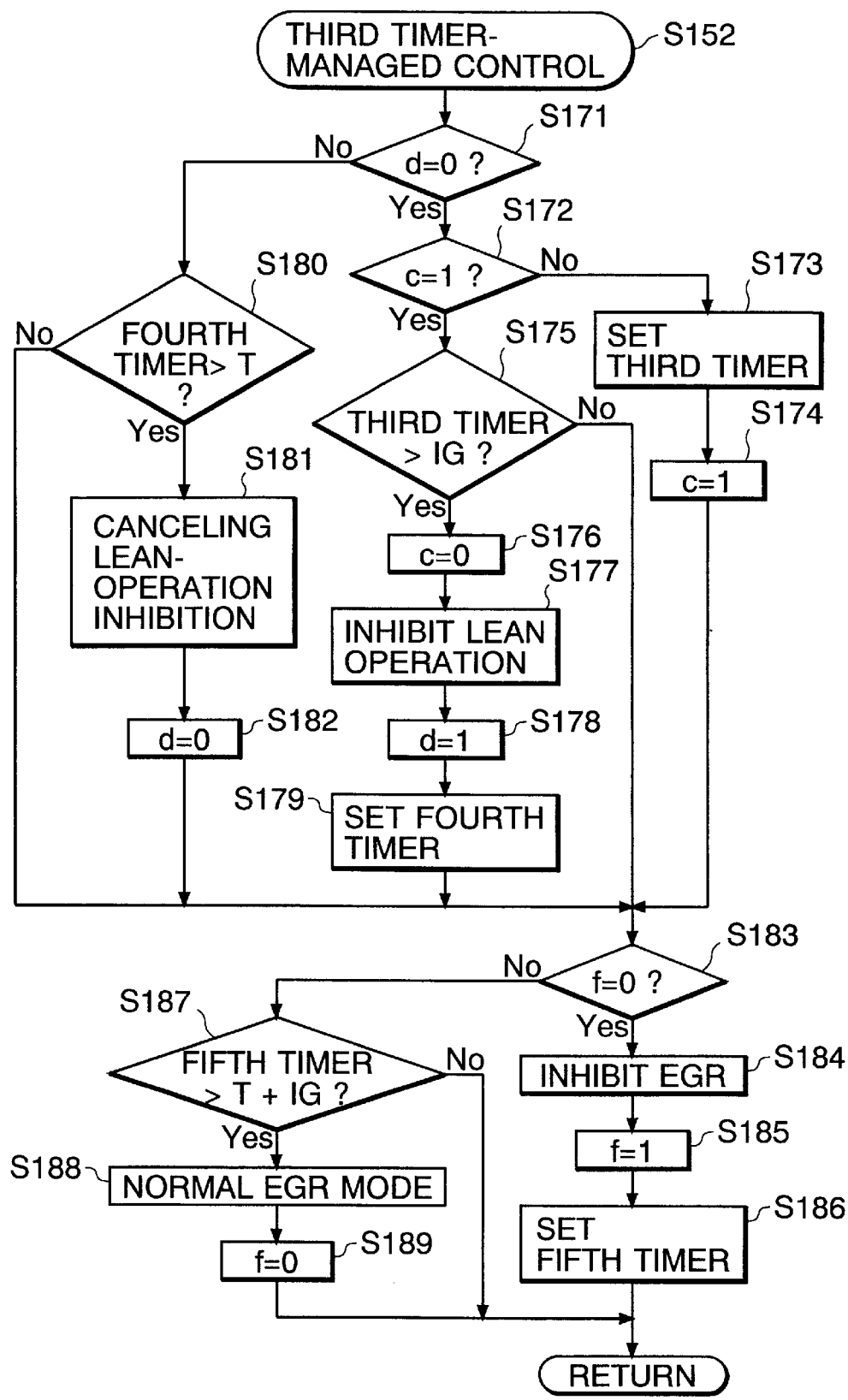
FIG. 16 is a flowchart showing procedures of a third timer-managed control in the subroutine shown in FIG. 14.

In the third timer-managed lean-operation inhibiting control at the time of vehicle stop (step S152), as shown in FIG. 16, whether or not a flag "d" is at a value of 0 indicative of non-execution of the third timer-managed lean-operation inhibiting control is determined (step S171). If the result of this determination is YES, a determination is made as to whether or not a flag "c" is at a value of 1 indicative of reservation of start of the just-mentioned lean-operation inhibiting control (step S172). When the subroutine shown in FIG. 16 is entered for the first time, the lean-operation inhibiting control has not been started. Thus, the result of the determination at step S172 becomes No. In this case, the third timer is set for a predetermined EGR inhibiting time period IG (step S173), and the flag "c" is set to a value of 1 indicative of reservation of start of the lean-operation inhibiting control (step S174). After start of the third timer, in accordance with the value of a flag "f", an EGR inhibiting control is performed as will be described later.

When the subroutine shown in FIG. 16 is entered again after setting the third timer for the predetermined EGR inhibiting time period IG, it is determined at step S172 that the flag "c" is at a value of 1 indicating that the start of the lean-operation inhibiting control is reserved. In this case, whether or not the predetermined EGR inhibiting time IG has elapsed is determined with reference to the time measured by the third timer (step S175). When the elapse of the predetermined time IG is detected, the flag "c" is reset to a value of 0 indicative of permission of starting the lean-operation inhibiting control (step S176), and the lean-operation inhibiting control is performed (step S177). Then, a flag "d" is set at a value of 1 indicative of execution of the lean-operation inhibiting control (step S178), and a fourth timer for measuring a time period for which the lean-operation inhibiting control is executed is started (step S179).

When the subroutine of FIG. 16 is entered again at the next control cycle, it is determined at step S171 that the flag "d" is at the value of 1 indicative of execution of the lean-operation inhibiting control. In this case, a determination is made as to whether or not the time counted by the fourth timer exceeds a predetermined time period which was set as the parameter T (step S180). If it is confirmed that the lean-operation inhibiting control is performed for the predetermined time period, the lean-operation inhibiting control mode is canceled (step S181), and the flag "d" is reset to a value of 0 indicative of non-execution of the inhibiting control (step S182). Accordingly, at the time of vehicle stop, if a small shortage of vacuum is determined in the subroutine shown in FIG. 14, or if a braking manipulation is detected in the same subroutine with no vacuum shortage being determined, then the lean-operation inhibiting control is performed for the time period shown by the parameter T after only the EGR inhibition, starting upon determination of small vacuum shortage or upon detection of braking manipulation, is executed for the predetermined time IG.

In the EGR inhibiting control which is started prior to the lean-operation inhibiting control and which is executed in parallel with the lean-operation inhibiting control after the elapse of the predetermined period IG during which the EGR inhibition alone is carried out, whether or not a flag "f" is at a value of 0 indicative of non-execution of the EGR inhibiting control is determined (step S183). If the flag "f" is at the value of 0, then the EGR inhibition control is performed (step S184), the flag "f" is set at the value of 1 indicative of execution of EGR inhibition control (step S185), and a fifth timer for measuring a time period for which the EGR inhibition alone is executed is started (step S186). Next, a determination is made as to whether or not the time period counted by the fifth timer exceeds a time T+IG which is the sum of the predetermined time represented by the parameter T and the predetermined time IG (step S187). When the elapse of the time T+IG is detected, the EGR inhibition control mode is canceled and a normal EGR control mode is resumed (step S188). Following the cancellation of the EGR inhibition mode, the flag "f" is reset to a value of 0 indicative of non-execution of the EGR inhibiting control (step S189), whereupon the processing shown in FIG. 16 is finished.

Accordingly, the EGR inhibition control in this case is performed for the time period T+IG equal to the sum total of the predetermined time IG and the time shown by the parameter T (one second or two seconds) and starting at the moment when a small shortage of vacuum at the time of vehicle stop was determined, or when the braking manipulation is detected under the condition where no shortage of vacuum is found. Thus, under the above circumstance, at first, only the EGR inhibition is started, and after the predetermined time IG has elapsed, the lean-operation inhibiting control is performed in parallel with the EGR inhibition control.

Next, a control for canceling the lean-operation inhibition (steps S130 and S153) is explained. In this control performed in accordance with a procedure shown in FIG. 17, flags "a", "d" and "h" indicating whether the lean-operation inhibiting control is being carried out or not are checked in sequence (steps S190, S191 and S192). If none of the flags "a", "d" and "h" is at a value of 1, this indicates that the lean-operation inhibiting control per se is not carried out, and hence no process for cancellation of the lean-operation inhibiting control mode is performed.

If it is determined at step S190 of FIG. 17 that the flag "a" is at 1, this indicates that the lean-operation inhibition canceling step S130 of FIG. 12 is entered as a result of, e.g., a changeover from ON to OFF of the idle switch 111 before completion of the lean-operation inhibiting control of FIG. 13, the control of FIG. 13 being started in response to, e.g., the determination result showing that the degree of shortage of vacuum at the time of vehicle running is small and the idle switch 111 is ON. In case that the flag "a" is at 1, whether or not the time counted by the first timer exceeds the predetermined time period represented by the parameter T is determined (step S193).

If it is determined at step S191 of FIG. 17 that the flag "d" is at a value of 1, this indicates that the cancellation control step S153 of FIG. 14 is entered as a result of, e.g., a changeover from ON to OFF of the brake switch 34 or the idle switch 111 before completion of that control for inhibiting the EGR and the lean-operation which was started in response to the determination that the level of shortage of vacuum at the time of vehicle stop is low and the brake switch 34 or the idle switch 111 is ON. In this case, whether or not the time counted by the fourth timer exceeds the predetermined time given by the parameter T is determined (step S194).

When it is determined based on the time measured by the first or fourth timer that the time for which the lean-operation inhibiting control under each condition should be executed has elapsed (steps S193 and S194), the lean-operation inhibiting control is canceled (step S195).

The determination at step S192 that the flag "h" is at a value of 1 indicates that the lean-operation inhibition canceling step S130 of FIG. 12 is entered in response to, e.g., a shift from a state with a large vacuum shortage to a state with no vacuum shortage during the execution of the lean-operation inhibiting control of FIG. 12 which was started as a result of, e.g., the determination of a large vacuum shortage. In this case, the lean-operation inhibiting control is canceled (step S195). At the next step S196, the flags "a", "d" and "h" are reset to a value of 0.

If the lean-operation inhibiting control is canceled in the above manner, whether or not the EGR inhibiting control mode should be canceled is determined. In this determination, the flags "f" and "i" are checked (steps S197 and S198). If none of the flags "f" and "i" is at a value of 1, no EGR inhibition control is performed, and hence the execution of the subroutine of FIG. 17 in the present control cycle is finished. If the flag "f" is at a value of 1, on the other hand, it is determined whether or not the time counted by the fifth timer exceeds the time T+IG corresponding to the sum total of the time given by the parameter T and the predetermined EGR inhibition time IG (step S199). When the elapse of the above time T+IG is detected, or when the flag "i" is at the value of 1, the EGR inhibition control mode is canceled and the normal EGR control mode is resumed (step S200). Then, the flags "f" and "i" are reset to a value of 0 (step S201), whereupon the subroutine is finished.

Although illustration is omitted in FIG. 17, during the execution of the EGR/lean-operation inhibiting control of FIG. 14 started in response to the determination that the vacuum shortage level is large, if the state with a large vacuum shortage is changed over to a state with no vacuum shortage, then the EGR/lean-operation inhibiting control is canceled after the elapse of the predetermined period IG.

According to the aforementioned lean-operation/EGR inhibiting control shown in FIGS. 11–17, the inhibition of lean-operation and the control of EGR are carried out properly in accordance with the degree of shortage of the vacuum in the intake manifold 21 and those operating states of the vehicle and engine body (in a broad sense, the engine body operating state) which are represented by vehicle speed V and ON/OFF states of the brake switch 34 and the idle switch 111, as shown in FIG. 10.

Accordingly, as compared with the case where the lean inhibition is controlled in dependence on the result of determination on a reduction in vacuum with use of a fixedly set determination value, the vacuum can be controlled in an significantly accurate manner. This makes it possible to avoid a sudden changeover of the operation mode of the engine body 1. For example, simply by lightly performing the inhibition control of the lean operation at the time when the vacuum is lowered to a certain degree, a shortage of the vacuum can be compensated. In other words, before occurrence of such a substantial shortage of vacuum as to make the vacuum actuator difficult to operate satisfactorily, the shortage of vacuum can be effectively compensated by simply inhibiting the lean operation for a short period of time. Accordingly, the present embodiment is superior to the preceding embodiment in that a deteriorated drivability caused by the inhibition of lean operation can be avoided properly.

Further, in this embodiment, the absolute level of the vacuum and the relative level thereof relative to an atmospheric pressure are obtained from the output of the vacuum sensor 34, and the lean-operation inhibiting control for eliminating a vacuum shortage is performed by properly using the absolute pressure and the relative pressure. Thus, a vacuum required for a stable operation of the brake can be secured, while enjoying an advantage of lean operation such that the specific fuel consumption can be improved.

Still further, in the embodiment, only the EGR inhibition control is performed for a predetermined time period before the inhibition of lean operation, if the level of shortage of vacuum is low. The execution of the EGR inhibition alone sometimes makes it possible to secure a required vacuum. In this case, the inhibition of lean operation can be omitted, and hence a changeover from the lean operation mode to another operation mode, which may be a cause of a degraded drivability, is unnecessary, so that the drivability can be improved. According to the embodiment where the lean operation is inhibited after the execution of EGR inhibition, the EGR gas does not stay in the intake pipe, the control parameter such as air-fuel ratio and fuel injection amount can be easily grasped, and hence the combustion state can be accurately grasped. This makes it possible to effect a stable control.

The present invention is not limited to the above described embodiments.

For example, it is as a matter of course possible to perform the lean operation inhibition or the EGR inhibition control by using the output of only one of the vacuum switch 33 and the brake switch 34.

Further, in the first embodiment, the lean operation is inhibited by switching the lean-operation mode to the stoichiometric operation mode in response to the output of the vacuum switch 33 or the brake switch 34. However, the lean operation is not necessarily inhibited by effecting the changeover to the stoichiometric operation mode. The intake air amount may be decreased by effecting a changeover from the second operation mode to the first operation mode in response to the output from the vacuum switch 33 or the brake switch 34.

The control according to the present invention may be carried out aside from the technical concept of switching the operation mode. For example, the control may be made by simply actuating the throttle valve in the closing direction so as to reduce the air-fuel ratio. With regard to the EGR, moreover, in stead of inhibiting the EGR, the EGR amount may be reduced to a certain degree.

It is not essentially required to effect the control in response to the output from the switch 33 or 34. For example, the lean-operation inhibiting (air-fuel ratio changing) control or the EGR inhibiting control may be made on the basis of results of estimation or detection of a vacuum in the vacuum booster 32. As described in respect of the second embodiment, the estimation or detection of the vacuum may be made on the basis of pieces of information relating to the engine operating state, such as air-fuel ratio.

In accordance with the vacuum level in the vacuum booster 32, only the EGR amount or only the lean operation inhibition (change of the air-fuel ratio) may be controlled. Alternatively, a satisfactory vacuum may be secured in the entire engine operation range by performing a control in which the aforementioned types of control are suitably combined.

A vacuum securing control may be performed on the basis of an estimated level of a vacuum acting on the vacuum actuator. The estimation of vacuum level may be made based on pieces of information, such as an EGR amount, a target air-fuel ratio (A/F) determined on the basis of throttle opening degree and engine speed, or the like. This arrangement does not require the provision of a vacuum switch, vacuum sensor and the like and is hence advantageous in costs.

Further, in stead of using the brake switch 34 for detecting a braking manipulation, the vacuum securing control can be performed by detecting, e.g., a returning action of the accelerator throttle which indicates a deceleration manipulation. Also, the present invention is applicable to an arrangement which has an electro-magnetic throttle valve (which is called as a drive by wire) serving as an intake air amount control mechanism and which is designed to control the intake air amount independently of the accelerator opening degree by use of the electro-magnetic throttle valve. The vacuum actuator is not limited to one which constitutes part of a brake mechanism, but may be a component of other devices. For example, the vacuum actuator may be a component of an idle-up device for an air conditioner or a power steering device, or of an intake pipe length varying device for changing an effective intake pipe length, or of a drive apparatus of a variable intake device for changing a swirl ratio.

The present invention may be modified in various ways within the scope of the invention.

What is claimed is:

1. A lean-burn internal combustion engine including an engine body having an air intake system and adapted for a lean combustion operation, an intake air amount control mechanism provided in the air intake system for adjusting an amount of intake air supplied to the engine body, a vacuum actuator operable with use of a vacuum taken out of the air intake system downstream of the intake air amount control mechanism, and combustion control means for operating the engine body to effect the lean combustion in accordance with an operating state of the engine body, comprising:

operating state detecting means for detecting an operating state of the engine body;

vacuum reduction detecting means for detecting vacuum information relating to a vacuum which acts on the vacuum actuator and for detecting a reduction in the vacuum based on the vacuum information; and vacuum securing means for controlling the intake air amount control mechanism so as to secure the vacuum by decreasing the amount of intake air to decrease air-fuel ratio when said vacuum reduction detecting means detects a reduction in the vacuum at a time of the lean combustion operation of the engine body.

2. The lean-burn internal combustion engine according to claim 1, further comprising:

exhaust gas recirculation means for recirculating part of an exhaust gas from the engine body to the air intake system on a side downstream of the intake air amount control mechanism;

wherein said vacuum ensuring means controls said exhaust gas recirculation means based on the operating state detected by said operating state detecting means, so as to decrease an amount of exhaust gas recirculation or stop the exhaust gas recirculation, when said vacuum reduction detecting means detects a reduction in the vacuum at the time of the lean combustion operation of the engine body.

3. The lean-burn internal combustion engine according to claim 1, wherein said vacuum actuator is comprised of a vacuum booster for increasing leg-power acting on a brake pedal;

said vacuum reduction detecting means includes at least one of brake manipulation detecting means for detecting, as the vacuum information, a manipulation of the brake pedal and a vacuum switch for detecting, as the vacuum information, a level of the vacuum acting on the vacuum actuator; and said vacuum securing means controls the intake air amount control mechanism so as to inhibit the lean combustion operation for a predetermined period of time, when a brake pedal manipulation is detected by the brake manipulation detecting means or when the vacuum level detected by the vacuum switch is lower than a predetermined level.

4. The lean-burn internal combustion engine according to claim 1, further comprising:

exhaust gas recirculation means for recirculating part of an exhaust gas from the engine body to the air intake system on a side downstream of the intake air amount control mechanism;

wherein said vacuum reduction detecting means is comprised of a vacuum sensor for linearly detecting a level of the vacuum acting on the vacuum actuator; and wherein said vacuum securing means controls at least one of said intake air amount control mechanism and said exhaust gas recirculation means based on the vacuum level detected by said vacuum sensor and the operating state detected by said operating state detecting means, so as to decrease a corresponding one or both of the intake air amount and the exhaust gas recirculation amount.

5. The lean-burn internal combustion engine according to claim 4, wherein the engine body is of an in-cylinder injection type which is provided at a cylinder head with a fuel injection valve for directly injecting fuel into a combustion chamber, and which operates, under control of the combustion control means, to effect a changeover between a pre-mixing combustion operation and a stratified combustion operation in accordance with the operating state of the engine body;

said exhaust gas recirculation means recirculates a greater amount of exhaust gas at a time of the stratified combustion operation than at a time of the pre-mixing combustion operation;

said vacuum securing means controls said intake air amount control mechanism and said exhaust gas recirculation system so as to inhibit the lean combustion operation and to decrease the amount of exhaust gas recirculation or stop the exhaust gas recirculation, when the level of shortage of the vacuum is determined to be high based on the vacuum level detected by said vacuum sensor; and said vacuum securing means selectively operates said intake air amount control mechanism or said exhaust gas recirculation system so as to reduce the amount of the intake air or to reduce the amount of the exhaust gas recirculation or stop the exhaust gas recirculation, when the level of shortage of the vacuum is determined to be low based on the vacuum level.

6. The lean-burn internal combustion engine according to claim 4, wherein the engine body is of an in-cylinder injection type which is provided at a cylinder head with a fuel injection valve for directly injecting fuel into a combustion chamber, and which operates, under control of the combustion control means, to effect a changeover between a pre-mixing combustion operation and a stratified combustion operation in accordance with the operating state of the engine body;

said exhaust gas recirculation means recirculates a greater amount of exhaust gas at a time of the stratified combustion operation than at a time of the pre-mixing combustion operation; and said vacuum securing means operates said exhaust gas recirculation means so as to reduce the amount of the exhaust gas recirculation or stop the exhaust gas recirculation, and then operates, where required, the intake air amount control mechanism to inhibit the lean combustion operation, when the level of shortage of the vacuum is determined to be low based on the vacuum level.

* * * * *